(12) United States Patent
Chiu et al.

(10) Patent No.: US 8,017,857 B2
(45) Date of Patent: Sep. 13, 2011

(54) METHODS AND APPARATUS FOR STRINGED CONTROLLERS AND/OR INSTRUMENTS

(75) Inventors: Bernard Chiu, Boston, MA (US); Mark Izen, Chestnut Hill, MA (US); Stephen Paul Webster, Oakville (CA); Jack Daniel Davis, Wellesley, MA (US); Craig Small, Framingham, MA (US); Wendy Lynn Mittelstadt, Lowell, MA (US); Gabriel J. Viani, Salem, MA (US)

(73) Assignee: 745 LLC, Boston, MA (US)

( * ) Notice: Subject to any disclaimer, the term of this patent is extended or adjusted under 35 U.S.C. 154(b) by 176 days.

(21) Appl. No.: 12/359,242

(22) Filed: Jan. 23, 2009

(65) Prior Publication Data

US 2009/0188371 A1   Jul. 30, 2009

Related U.S. Application Data

(60) Provisional application No. 61/023,285, filed on Jan. 24, 2008.

(51) Int. Cl.
*G10H 1/40* (2006.01)
*G10H 1/46* (2006.01)

(52) U.S. Cl. ............ 84/723; 84/609; 84/611; 84/633; 84/644

(58) Field of Classification Search .......... 84/723
See application file for complete search history.

(56) References Cited

U.S. PATENT DOCUMENTS

| | | | |
|---|---|---|---|
| 3,015,247 A | 1/1962 | Allers | |
| 3,797,355 A * | 3/1974 | Law | 84/273 |
| 4,263,520 A | 4/1981 | Kajihata et al. | |
| 4,372,187 A | 2/1983 | Berg | |
| 4,580,479 A | 4/1986 | Bonanno | |
| 4,630,520 A | 12/1986 | Bonanno | |
| 4,653,376 A | 3/1987 | Allured et al. | |
| 4,702,141 A | 10/1987 | Bonanno | |
| 4,730,530 A | 3/1988 | Bonanno | |
| 4,748,887 A | 6/1988 | Marshall | |
| 4,791,848 A | 12/1988 | Blum, Jr. | |
| 4,823,667 A | 4/1989 | Deutsch et al. | |
| 4,858,509 A | 8/1989 | Marshall et al. | |

(Continued)

FOREIGN PATENT DOCUMENTS

EP    0340734 A2   11/1989

(Continued)

OTHER PUBLICATIONS

International Search Report and Written Opinion for International Application No. PCT/US2009/000434 dated May 28, 2009.

(Continued)

*Primary Examiner* — Christopher Uhlir
(74) *Attorney, Agent, or Firm* — Wolf, Greenfield & Sacks, P.C.

(57) ABSTRACT

Stringed instruments, game controllers, and related structures and methods are described. A game controller having one or more strings is described for a computer gaming application. Output signals may be sent from the controller to the gaming application indicative of fingering of the game controller and the time at which the strings of the game controller are struck. Multi-mode apparatus are also described. A stringed apparatus may be used as both a game controller and an instrument. Bracing structures and methods are also described for bracing stringed apparatus, such as stringed game controllers and instruments.

22 Claims, 20 Drawing Sheets

U.S. PATENT DOCUMENTS

| | | |
|---|---|---|
| 4,919,031 A | 4/1990 | Matsumoto |
| 4,939,471 A | 7/1990 | Werrbach |
| 4,951,545 A | 8/1990 | Yoshida |
| 4,960,031 A | 10/1990 | Farrand |
| 4,986,157 A | 1/1991 | Matsubara |
| 5,001,960 A | 3/1991 | Katou |
| 5,010,800 A | 4/1991 | Yoshida |
| 5,014,588 A | 5/1991 | Omata et al. |
| 5,024,134 A | 6/1991 | Uchiyama |
| 5,025,703 A | 6/1991 | Iba et al. |
| 5,040,447 A | 8/1991 | Murata et al. |
| 5,048,391 A | 9/1991 | Uchiyama et al. |
| 5,065,659 A | 11/1991 | Uchiyama et al. |
| 5,074,182 A | 12/1991 | Capps et al. |
| 5,085,120 A | 2/1992 | Ishiguro |
| 5,094,137 A | 3/1992 | Matsumoto |
| 5,113,742 A | 5/1992 | Matsumoto |
| 5,121,669 A | 6/1992 | Iba et al. |
| 5,135,426 A | 8/1992 | Lin |
| 5,140,887 A | 8/1992 | Chapman |
| 5,140,890 A | 8/1992 | Elion |
| 5,146,833 A | 9/1992 | Lui |
| 5,147,970 A | 9/1992 | Obata |
| 5,153,364 A | 10/1992 | Uchiyama et al. |
| 5,206,446 A | 4/1993 | Matsumoto et al. |
| 5,223,659 A | 6/1993 | Shiraki et al. |
| 5,270,475 A | 12/1993 | Weiss et al. |
| 5,300,730 A | 4/1994 | Ekhaus |
| 5,305,674 A | 4/1994 | Fishman et al. |
| 5,308,916 A | 5/1994 | Murata et al. |
| 5,393,926 A | 2/1995 | Johnson |
| 5,398,585 A | 3/1995 | Starr |
| 5,464,946 A | 11/1995 | Lewis |
| 5,488,196 A | 1/1996 | Zimmerman et al. |
| 5,491,297 A | 2/1996 | Johnson et al. |
| 5,557,057 A | 9/1996 | Starr |
| 5,585,583 A | 12/1996 | Owen |
| 5,602,356 A | 2/1997 | Mohrbacher |
| 5,627,331 A | 5/1997 | Devitry-Smith |
| 5,670,729 A | 9/1997 | Miller et al. |
| 5,690,496 A | 11/1997 | Kennedy |
| 5,710,387 A | 1/1998 | Szalay |
| 5,717,155 A | 2/1998 | Szalay |
| 5,723,802 A | 3/1998 | Johnson et al. |
| 5,726,372 A | 3/1998 | Eventoff et al. |
| 5,728,960 A | 3/1998 | Sitrick |
| 5,739,457 A | 4/1998 | Devecka |
| 5,744,744 A | 4/1998 | Wakuda |
| 5,746,605 A | 5/1998 | Kennedy |
| 5,773,742 A | 6/1998 | Eventoff et al. |
| 5,777,251 A | 7/1998 | Hotta et al. |
| 5,786,541 A | 7/1998 | Komano et al. |
| 5,792,971 A | 8/1998 | Timis et al. |
| 5,864,083 A | 1/1999 | Caren |
| 5,902,949 A | 5/1999 | Mohrbacher |
| 5,925,843 A | 7/1999 | Miller et al. |
| 5,945,621 A | 8/1999 | Ishibashi |
| 5,990,405 A | 11/1999 | Auten et al. |
| 6,001,013 A | 12/1999 | Ota |
| 6,010,403 A | 1/2000 | Adam et al. |
| 6,049,034 A | 4/2000 | Cook |
| 6,075,194 A | 6/2000 | Marinic et al. |
| 6,091,013 A | 7/2000 | Waller, Jr. et al. |
| 6,149,523 A | 11/2000 | Yamada et al. |
| 6,162,981 A | 12/2000 | Newcomer et al. |
| 6,175,070 B1 | 1/2001 | Naples et al. |
| 6,177,623 B1 | 1/2001 | Ooseki |
| 6,191,350 B1 | 2/2001 | Okulov et al. |
| 6,225,547 B1 | 5/2001 | Toyama et al. |
| 6,242,682 B1 | 6/2001 | Marinic et al. |
| 6,252,153 B1 | 6/2001 | Toyama |
| 6,268,557 B1 | 7/2001 | Devecka |
| 6,312,335 B1 | 11/2001 | Tosaki et al. |
| 6,319,130 B1 | 11/2001 | Ooseki et al. |
| 6,342,665 B1 | 1/2002 | Okita et al. |
| 6,347,998 B1 | 2/2002 | Yoshitomi et al. |
| 6,353,165 B1 | 3/2002 | Chiu et al. |
| 6,379,244 B1 | 4/2002 | Sagawa et al. |
| 6,390,923 B1 | 5/2002 | Yoshitomi et al. |
| 6,410,835 B2 | 6/2002 | Suzuki et al. |
| 6,425,822 B1 | 7/2002 | Hayashida et al. |
| 6,425,827 B1 | 7/2002 | Nimura |
| 6,429,863 B1 | 8/2002 | LoPiccolo et al. |
| 6,444,887 B1 | 9/2002 | Hiraoka et al. |
| 6,450,888 B1 | 9/2002 | Takase et al. |
| 6,452,081 B1 | 9/2002 | Ravagni et al. |
| 6,461,239 B1 | 10/2002 | Sagawa et al. |
| 6,482,087 B1 | 11/2002 | Egozy et al. |
| 6,515,211 B2 | 2/2003 | Umezawa et al. |
| 6,541,688 B2 | 4/2003 | Asahi |
| 6,541,692 B2 | 4/2003 | Miller |
| 6,554,711 B1 | 4/2003 | Kawasaki et al. |
| 6,607,446 B1 | 8/2003 | Shimomura et al. |
| 6,609,979 B1 | 8/2003 | Wada |
| 6,634,886 B2 | 10/2003 | Oyama et al. |
| 6,638,160 B2 | 10/2003 | Yoshitomi |
| 6,645,067 B1 | 11/2003 | Okita et al. |
| 6,686,530 B2 | 2/2004 | Juszkiewicz et al. |
| 6,738,059 B1 | 5/2004 | Yoshinaga et al. |
| 6,740,803 B2 | 5/2004 | Brinkman et al. |
| 6,758,756 B1 | 7/2004 | Horigami et al. |
| 6,769,689 B1 | 8/2004 | Shimomura et al. |
| 6,777,608 B1 | 8/2004 | Redding |
| 6,786,821 B2 | 9/2004 | Nobe et al. |
| 6,821,203 B2 | 11/2004 | Suga et al. |
| 6,822,153 B2 | 11/2004 | Comair et al. |
| 6,835,887 B2 | 12/2004 | Devecka |
| 6,846,980 B2 | 1/2005 | Okulov |
| 6,852,919 B2 | 2/2005 | Ludwig |
| 6,888,057 B2 | 5/2005 | Juszkiewicz et al. |
| 6,915,488 B2 | 7/2005 | Omori et al. |
| 6,969,797 B2 | 11/2005 | Brinkman et al. |
| 6,979,767 B2 | 12/2005 | Georges et al. |
| 6,995,310 B1 | 2/2006 | Knapp et al. |
| 7,030,307 B2 | 4/2006 | Wedel |
| 7,030,311 B2 | 4/2006 | Brinkman et al. |
| 7,038,123 B2 | 5/2006 | Ludwig |
| 7,112,738 B2 | 9/2006 | Hyakutake et al. |
| 7,128,649 B2 | 10/2006 | Nobe et al. |
| 7,145,070 B2 | 12/2006 | Barry |
| 7,151,214 B2 | 12/2006 | Barry |
| 7,164,076 B2 | 1/2007 | McHale et al. |
| 7,166,794 B2 | 1/2007 | Juszkiewicz et al. |
| 7,169,996 B2 | 1/2007 | Georges et al. |
| 7,174,510 B2 | 2/2007 | Salter |
| 7,220,906 B2 | 5/2007 | Sasaki |
| 7,220,912 B2 | 5/2007 | Juszkiewicz et al. |
| 7,220,913 B2 | 5/2007 | Juszkiewicz |
| 7,223,913 B2 | 5/2007 | Knapp et al. |
| 7,270,602 B2 | 9/2007 | Uehara et al. |
| 7,304,224 B1 | 12/2007 | Bettis et al. |
| 7,304,232 B1 | 12/2007 | Nicholes |
| 7,320,643 B1 | 1/2008 | Brosius et al. |
| 7,459,624 B2 | 12/2008 | Schmidt et al. |
| 7,806,759 B2 | 10/2010 | McHale et al. |
| 2003/0140770 A1* | 7/2003 | Barry ............... 84/610 |
| 2006/0243123 A1* | 11/2006 | Ierymenko ............... 84/742 |
| 2007/0051224 A1* | 3/2007 | Batio ............... 84/318 |
| 2007/0209496 A1* | 9/2007 | Lenzi ............... 84/313 |
| 2007/0232374 A1 | 10/2007 | Lopiccolo et al. |
| 2008/0297328 A1 | 12/2008 | Crawford et al. |
| 2009/0191932 A1 | 7/2009 | Chiu et al. |
| 2010/0234109 A1 | 9/2010 | Chiu et al. |
| 2010/0279772 A1 | 11/2010 | Chiu et al. |

FOREIGN PATENT DOCUMENTS

| | | |
|---|---|---|
| JP | 08-185160 A | 7/1996 |
| JP | 10-099546 A | 4/1998 |
| JP | 10-214155 A | 8/1998 |
| WO | WO 96/04642 A1 | 2/1996 |
| WO | WO 2007/115072 A1 | 10/2007 |

OTHER PUBLICATIONS

Gamest Magazine Publication dated Jun. 15, 1998, pp. 210-220.
Gamest Magazine Publication dated Jul. 15, 1998, pp. 176-177.
Hotei, et al., "Stolen Song," 1998, Virtual Music Entertainment, Inc.
Office Action in Japanese Patent Application No. 11-0308872 dated Jan. 16, 2001.
Bray, H., "The unsung story of Quest for Fame in 1994, a game resembling Guitar Hero was ready to rock. So why wasn't it a hit?" *The Boston Globe*, Boston, Massachusetts, Dec. 26, 2008, p. B.10.
International Search Report and Written Opinion mailed May 12, 2010 in International Application No. PCT/US2010/027493.

* cited by examiner

User's Open Strumming / / / / / / / / / / / / / / / /

Chord Progression Produced Aurally via Software    C C C C G G G G C C C C F F F F (A)

User's Open Picking / / / / / / / / / / / / / / / /

Melody is Produced Aurally via Software    C D E F G A B C B A G F E D C C (B)

*Fig. 18*

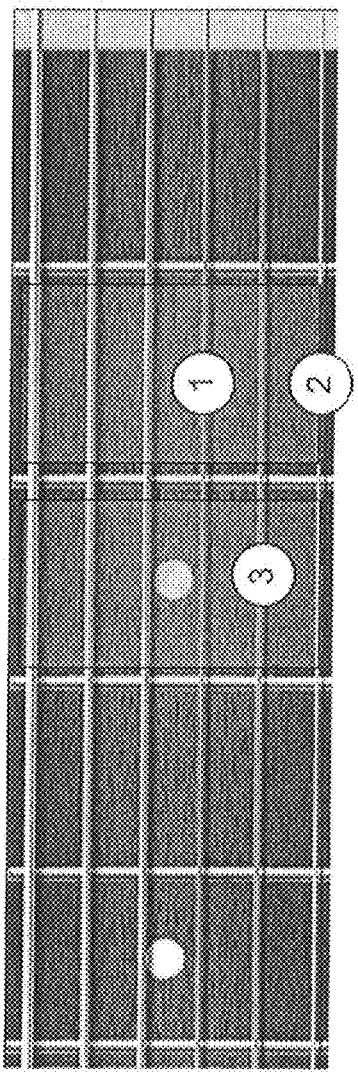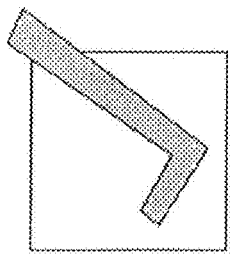
Fig. 19

METHODS AND APPARATUS FOR STRINGED CONTROLLERS AND/OR INSTRUMENTS

This application claims priority from U.S. Provisional Patent Application Ser. No. 61/023,285, filed Jan. 24, 2008, and entitled "Guitar Controller," which application is incorporated herein by reference.

FIELD

The technology described herein relates to stringed controllers and/or instruments.

BACKGROUND ART

Some popular computer gaming applications, such as the Guitar Hero® games, employ a special controller that has some similarities to an instrument (e.g., is generally guitar-shaped), but which differs significantly from an actual instrument. The controller for use with Guitar Hero® has no strings and instead has colored fret buttons and a strum bar. The controller provides two types of information to the gaming software, referred to herein as selection information and timing information. The selection information is provided by depressing the fret buttons, and the timing information is provided by toggling the strum bar. A series of icons, each corresponding to a color and position of one of the fret buttons, is displayed on the game screen as music is played. The player's goal is to hold down the fret button corresponding to the icon shown and toggle the strum bar at the same time that a note passes a marked area on the game screen.

SUMMARY

According to one aspect, a game controller comprises a body comprising a fingerboard, a plurality of strings extending along the fingerboard, at least one first sensor adapted to detect fingering of the fingerboard by a user of the game controller, at least one second sensor adapted to detect striking of at least one of the plurality of strings by the user of the game controller, and at least one control module that is coupled to the at least one first sensor and the at least one second sensor and that provides at least one electrical signal indicating the fingering of the fingerboard by the user and indicating the striking of at least one of the plurality of strings by the user.

According to another aspect, a method is provided. The method comprises (A) generating control signals for a computer game based on user interactions with a controller that comprises a body comprising a fingerboard, a plurality of strings extending along the fingerboard, at least one first sensor adapted to detect fingering of the fingerboard by a user of the game controller, and at least one second sensor adapted to detect striking of at least one of the plurality of strings by the user of the game controller. Generating the control signals comprises evaluating at least first and second distinct pieces of information relating to the user interactions, the first piece of information being indicative of fingering of the fingerboard by the user, and the second piece of information being indicative of the striking of at least one of the plurality of strings by the user.

According to another aspect, an adapter for adapting a musical instrument to enable the musical instrument to be used as a game controller is provided. The musical instrument comprises a body comprising a fingerboard and a plurality of strings extending along the fingerboard. The adapter comprises at least one first sensor adapted to detect fingering of the fingerboard by a user of the game controller, at least one second sensor adapted to detect striking of at least one of the plurality of strings by the user of the game controller, and at least one control module that is coupled to the at least one first sensor and the at least one second sensor and that provides at least one electrical signal indicating the fingering of the fingerboard by the user and indicating the striking of at least one of the plurality of strings by the user.

According to another aspect, a method of adapting a musical instrument to enable the musical instrument to be used as a game controller is provided. The musical instrument comprises a body comprising a fingerboard and a plurality of strings extending along the fingerboard. The method comprises: (A) positioning at least one first sensor on the fingerboard to detect fingering of the fingerboard by a user of the game controller; (B) providing at least one second sensor to detect striking of at least one of the plurality of strings by the user of the game controller; and (C) providing at least one electrical signal to a game, the at least one electrical signal indicating the fingering of the fingerboard by the user and indicating the striking of at least one of the plurality of strings by the user.

According to another aspect, a method for use with a stringed game controller that comprises a body, a plurality of strings extending along at least a portion of the body, and at least one sensor adapted to detect movement of the strings is provided. The method comprises acts of: (A) in response to a strike of at least one of the plurality of strings by a user of the game controller that causes vibration of the at least one of the plurality of strings, dampening the vibration to facilitate detection of a subsequent strike of the at least one of the plurality of strings; and (B) producing at least one game control signal based on the strike of the at least one of the plurality of strings.

According to another aspect, a stringed game controller comprises a body, a plurality of strings extending along at least a portion of the body, at least one sensor adapted to detect movement of at least one of the plurality of strings that results from a strike of the at least one of the plurality of strings by a user of the game controller that causes vibration of the at least one of the plurality of strings, and a dampener that dampens the vibration of the at least one of the plurality of strings to facilitate detection of a subsequent strike of at least one of the plurality of strings. The stringed game controller further comprises at least one control module that is coupled to the at least one sensor and that provides at least one electrical signal indicating the striking of at least one of the plurality of strings by the user.

According to another aspect, an apparatus comprises a body comprising a fingerboard, and a plurality of strings suspended between a first contact point and a second contact point and each having at least a portion extending along at least a portion of the fingerboard, wherein the portion of each of the plurality of strings extending between the first and second contact points vibrates when the string is struck while no portion thereof is in contact with the fingerboard, and wherein the portion of each of the plurality of strings extending along the at least a portion of the fingerboard is displaceable to bring the string into contact with the fingerboard and thereby adjust a length of the portion of the string that vibrates when the string is struck. The apparatus further comprises a brace coupled to the body and configured to resist forces exerted on the body by the plurality of strings and to maintain the first contact point and second contact point in a substantially fixed relationship to each other

BRIEF DESCRIPTION OF THE DRAWINGS

FIGS. 18 A-B illustrate various strumming and picking aspects of embodiments of the present invention.

FIG. 19 shows an interactive visual display according to another embodiment of the present invention.

DETAILED DESCRIPTION

Figure 1:
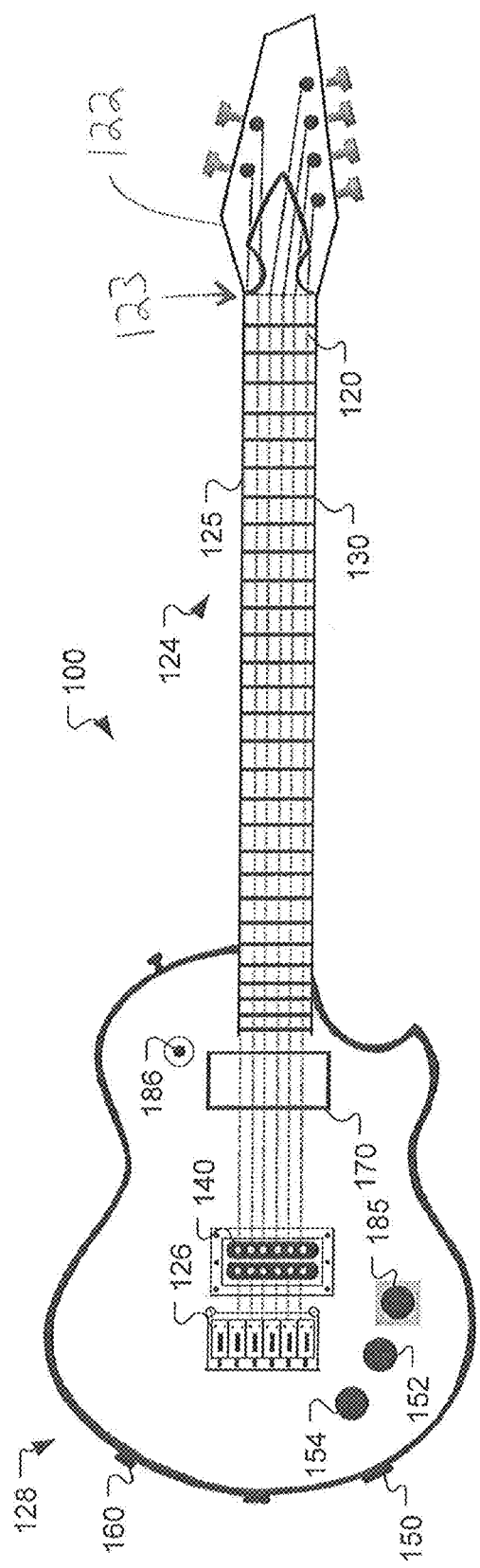
FIG. 1 shows an apparatus that may operate as both a game controller and an instrument, according to one embodiment of the present invention.

Applicants have appreciated that conventional guitar-shaped game controllers, such as those described above, differ from actual guitars in many ways, including in their lack of strings. Thus, such conventional game controllers do not provide the user with a realistic experience of playing an instrument.

According to one aspect of the technology described herein, a stringed controller for games, such as video games, is provided. In some detailed embodiments described below, the stringed controller resembles a guitar, but the aspects of the present invention described herein are not limited in this respect, and can be used with other fretted (e.g., a bass guitar) or unfretted (e.g., a violin or cello) instruments.

The stringed controller can be used for any type of gaming application, as the aspects of the invention described herein are not limited in this respect. In some embodiments, the stringed controller can be used with a play-along game, similar to Guitar Hero®, but provide a more realistic user/player experience. In other embodiments, the stringed controller can be used to control action in any type of game, and replace any existing controller, so that playing games can give the player experience with the instrument (e.g., in fingering the frets and strumming the strings of a guitar). In yet further embodiments, the stringed controller can be used to control a game specifically designed to teach the player how to play the instrument.

In some embodiments, the controller may be configured to provide output signals to a game (i.e., to a gaming application executing on a computer or gaming console), allowing a user to interact with the game. The output signals produced by the controller may represent any suitable information for interacting with the gaming application, such as indicating placement of a user's hands on the controller (e.g., fret placement on a fretted controller) as well as the timing at which one or more of the strings of the controller is played. The controller in some embodiments may further optionally include one or more components, such as user inputs (e.g., knobs, buttons, dials, or any other inputs), making it compatible with any of a variety of gaming systems (e.g., personal computers or a module for any gaming platform), as the various aspects relating to a stringed controller are not limited in this respect.

According to some aspects of the technology described herein, a stringed game controller may produce one or more output signals derived from different parts of the controller, or derived from different user interactions with the controller. For example, vibration of the strings of the stringed controller may be used to produce an output signal representing timing information (e.g., the time at which each string is initially played), or any other suitable timing information. A second type of information, such as information indicative of the positioning of a user's hand on the stringed controller (e.g., the fret position on a fretted controller), may be derived irrespective of whether the string is vibrating. Other types of information may also be provided, as the various aspects described herein are not limited to stringed controllers producing any particular types of output signals.

According to another aspect, a multi-mode apparatus is provided, which may function both as a stringed instrument (e.g., a guitar, a bass guitar, a violin, or any other stringed instrument) and as a game controller for a gaming application, such as a computer gaming application. When acting as an instrument, the apparatus may by played to produce musical notes, for example by plucking the strings and depressing a fret of a fretted instrument. In such a mode, the instrument may function in a conventional manner so that the output signal of the apparatus may be caused by the vibration of the string(s), which may be directly audible (for example, as with an acoustic instrument) or processed and amplified (e.g., as with an electric guitar), which output signal may therefore include tonal components reflecting movement of the strings and the length of the vibrating portion of the strings, i.e., pitch information. In this mode, the apparatus may be connected to a dedicated amplifier or to a computer or gaming system which may operate as an amplifier (e.g., a virtual amplifier), or may be directly played without connection to any external components, for example as in the case of an acoustic instrument. However, the various aspects described herein are not limited in this respect, as in the instrument mode the instrument may be used in any suitable manner, including in any of the ways instruments are conventionally employed.

When the multi-mode apparatus is operated as a game controller, the game application may derive any desired information from the user's interaction with the strings, but in some embodiments may not use any information about pitch or tone from the strings. As discussed above, in one embodiment separate information can be provided indicative of the positioning of the user's fingers on the fingerboard (e.g., fret position on a fretted device, which may be indicative of string length) and timing information from striking, or playing, a string (e.g., plucking, picking, or otherwise playing). To facilitate use of the strings for determining timing but not pitch information, the strings may be damped, for example to reduce or prevent vibration. A pickup may be used to detect movement of one or more strings of the apparatus, for example when struck by the user, and may generate a corresponding timing index component of a gaming input signal provided to the gaming software.

When the multi-mode apparatus is operated as a game controller, in some embodiments information about a user's hand positioning on the controller may be provided to the game in a manner other than by assessing tonal components of vibrations of the strings, i.e., other than by assessing the pitch of any vibrating string. For example, the apparatus may be fretted (e.g., a guitar), and one or more fret sensors may be used to detect contact of the strings with a fret. The fret sensor(s) may generate one or more components of a gaming input signal. Alternatively, the positioning of a user's hand may be determined using input buttons positioned on the instrument (e.g., on the fingerboard of the guitar), a pressure responsive material, or in any other suitable manner, as the aspects described herein are not limited in this respect.

As should be appreciated from the foregoing, according to one non-limiting embodiment, when the multi-mode apparatus is operated as a game controller, outputs of the controller may be generated that do not require detection of any string vibration tonal components. According to such embodiments, this may reduce or eliminate any need for the stringed controller to be in tune to properly function as a game controller. Rather, the strings of the apparatus may be used to derive timing information only, and the position of a user's hand may be determined by fret sensors, buttons, or in any other suitable manner. In some embodiments, the tonal components of the instrument/controller may be ignored entirely. However, all aspects of the invention are not limited in this respect, as the tonal output of the instrument/controller may optionally be used in some embodiments to provide an additional, or alternative, input.

According to one non-limiting embodiment, the apparatus may include a controller output module, which may process signals from the apparatus to determine one or more types of information from the user's interaction (e.g., timing information, hand positioning information, or any other type of information), and may then generate one or more controller output signals to be provided to the gaming application in any format recognized by the gaming application. Alternatively, raw signals indicative of the user's actions (e.g., representing timing and positioning information) may be provided to the gaming application, which may process the raw signals to determine desired types of information, such as timing and/or positioning information, or any other desired types of information. Other manners of signal processing are also possible, as the various aspects described herein relating to a game controller are not limited in this respect.

It should be appreciated that while some embodiments described herein relate to a multi-mode device, not all embodiments are limited in this respect. Rather, according to some embodiments, a stringed controller may be a dedicated stringed controller, and may not be an actual instrument.

Applicants have further appreciated that it may be desirable to provide a game controller and/or instrument from materials (e.g., plastic or other materials) which can not withstand the loading force imposed by strings (e.g., the devices may bend or break when subjected to the loading force of the strings, or may be unable to hold tune to a satisfactory degree). Thus, according to one aspect of the technology described herein, a stringed instrument and/or instrument-shaped stringed controller may include a brace. The instrument and/or controller may be formed of one of more components, such as a body, a neck, a fingerboard, or any other suitable components, one or more of which may be formed of material(s) unable to withstand the loading forces imposed by strings. The instrument, or instrument-shaped controller, may be formed of multiple pieces fastened together, or of a single piece of material. A brace may be provided to enable the instrument and/or controller to withstand the loading force of the strings, and may be made of any material suitable for bracing the instrument or instrument-shaped controller against the loading force of the strings. The brace may be made of metal, wood, plastic, or any other suitable bracing material, as the braces described herein are not limited to being formed of any particular material. The brace may prevent the stringed apparatus (e.g., instrument, or instrument-shaped controller) from breaking. In addition, in accordance with some embodiments discussed below, the brace may facilitate keeping the apparatus in tune with little or no adjustment.

The aspects mentioned above, as well as further aspects of the technology, are now described in further detail. It should be appreciated that the aspects of the technology described above and below may be used individually, all together, or in any combination of two or more, as the technology described is not limited in this respect.

As mentioned, according to one aspect of the technology described herein, a stringed game controller is provided. FIG. 1 shows an apparatus 100 according to one embodiment, which apparatus may be used as a game controller for interfacing with a game, such as, but not limited to, a video game. While the apparatus 100 resembles a guitar, it should be appreciated that such a shape and structure is non-limiting, as stringed game controllers implementing one or more of the features described herein may be shaped similarly to bass guitars, violins, cellos, or any other stringed instruments.

The apparatus 100 comprises one or more strings 120 extending from the head 122 over the nut 123, along the neck 124 and fingerboard 125, over one or more pickups 140, to the bridge 126 on the guitar body 128. In one embodiment, there are six strings 120, but not all embodiments are limited in this respect, as any number of strings can be employed. According to some embodiments, the strings 120 produce electromagnetically detectable signals, and therefore may be made of an electrically conductive material, such as being steel guitar strings, nickel-wound strings, or may be formed of any other suitable string material, including materials not conventionally employed for guitar strings. The strings 120 may be light gauge strings, heavy gauge strings, or have any suitable gauge, as the stringed apparatus described herein are not limited to use with any particular string gauge. Depending on the length, diameter and mass of a given string 120, when it is struck (e.g., picked, plucked, strummed, or otherwise struck), the string 120 may vibrate with a harmonic tonal component corresponding to a musical note. Pushing a string 120 down onto one of the fingerboard frets 130 on the neck 124 changes its vibrational length, thereby changing the corresponding musical note associated with the string.

According to one embodiment, the apparatus 100 includes a guitar body 128 with at least one guitar pickup 140. The guitar pickup 140 may detect movement of one or more of the strings 120, and may generate an electrical signal, such as a voltage, in response to detecting such movement. In one embodiment, the pickup 140 may be a magnet surrounded by wires that detects movement of the strings 120 and produces a corresponding voltage output signal, but the aspects of the invention described herein are not limited in this respect, as the pickup 140 may be anything capable of detecting movement of the strings 120. For example, the guitar pickup 140 may be a double coil pickup assembly from a guitar pickup vendor having a plastic ring and shell cover, Humbucker bobbin, ceramic magnet, and pole piece assembly, or any other suitable structure. The guitar pickup 140 may be inserted from above and secured with screws to the guitar body 128, or may be connected to the apparatus 100 in any other suitable manner.

As described, in some embodiments the apparatus 100 may be a dedicated stringed game controller, i.e., that is not used in any mode as an instrument. According to other embodiments, the apparatus 100 may be a multi-mode apparatus operable both as a computer gaming input device (i.e., a game controller) and as an instrument (e.g., an electric guitar in the embodiment of FIG. 1). For use as an electric guitar, the guitar body 128 may include a standard quarter-inch stereo audio jack 150 for communicating the output signal from the guitar pickup 140 to an external audio amplifier (e.g., via an audio cable), or to any other suitable device. The audio amplifier may be a designated amplifier, such as a conventional guitar amplifier, a computer, or a gaming system operable as a virtual amplifier, or may be any other suitable amplifier, as the type of amplifier is non-limiting. When the apparatus 100 is operated as an instrument, the output signal from the guitar pickup 140 may be a conventional electric guitar output signal which contains string vibration tonal components representative of harmonic vibration of the strings 120, and the output signal may be adjusted by a volume control 152 and a tone control 154.

Whether the apparatus 100 is a dedicated game controller or a multi-mode apparatus capable of operating as a game controller, it may comprise one or more components and/or signal processing circuitry facilitating its operation as a game controller. For example, according to one embodiment, the apparatus 100 may provide one or more output signals (or one or more components of a single output signal) when operating as a game controller, which output signal(s) may provide one or more types of information for interacting with a gaming application. The apparatus may therefore include one or more components and/or signal processing circuitry suitable to produce such output signals.

With regard to the non-limiting example of FIG. 1, one type of signal produced by the apparatus 100 when operated as a game controller may represent the positioning of a user's hand, finger, or fingers, on the fingerboard 125. For example, the apparatus 100 may be a fretted apparatus, as shown in FIG. 1, and one type of signal produced by the apparatus when used as a game controller may indicate a fret position of a user's hand, although similar signals may be generated for non-fretted controllers. Such a signal indicating the position of a user's hand on the game controller may be generated in any suitable manner, as the various aspects relating to stringed game controllers are not limited in this respect. In addition, it should be appreciated that a signal indicative of a user's hand positioning on the game controller is merely one non-limiting example of a type of signal which may be generated.

Figure 4:
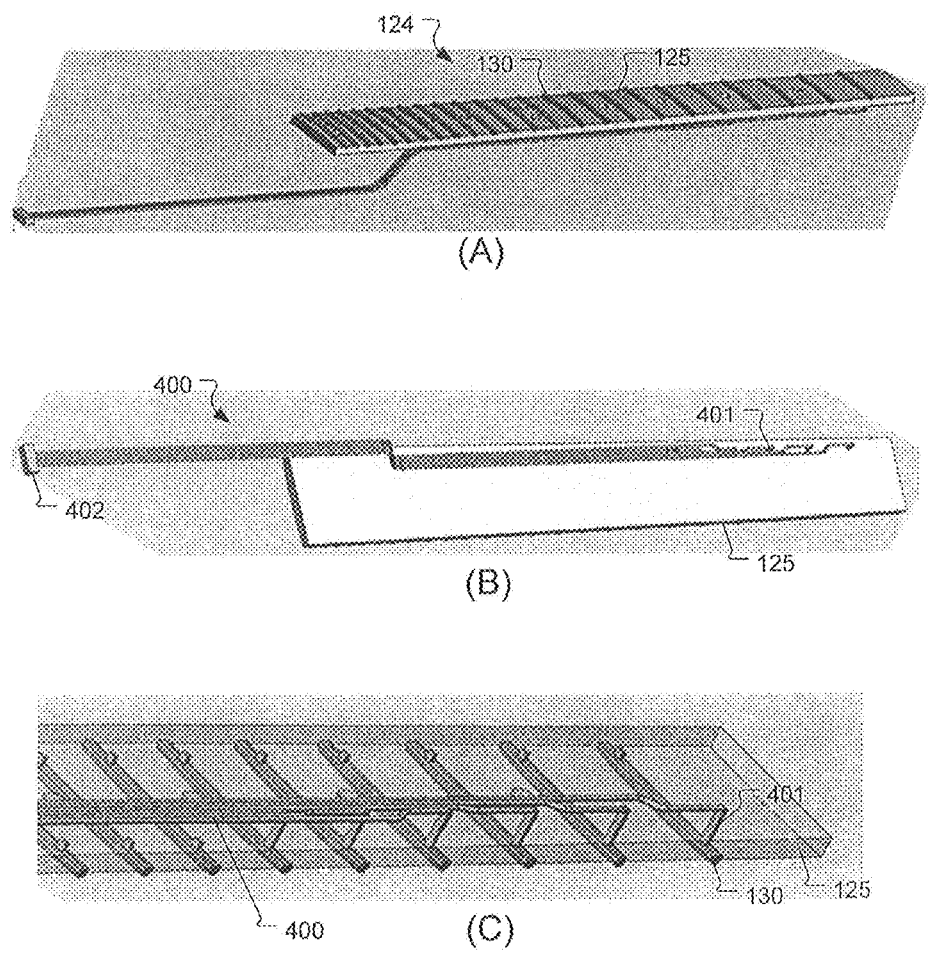
FIGS. 4 A-C show various aspects of fret detection arrangements according to embodiments of the present invention.

One manner in which a signal indicative of fret position may be determined is now described. However, it should be understood that other manners of such determination are possible, and that the following example is merely provided for purposes of illustration. For example, according to one non-limiting embodiment, the controller includes one or more fret sensors for detecting contact between the frets and one or more of the strings 120 to generate signals indicative of finger position that may be provided as an output signal (or portion thereof) which may serve as an input signal to a gaming application. FIGS. 4A-4C, described below, provide one non-limiting example of how fret position of the apparatus 100 may be detected. It should, however, be appreciated that any suitable technique for detecting fret position may be used, as the technology described herein is not limited to use with any particular technique of fret detection. Moreover, fret positioning detection is only one non-limiting example of an output signal which may be produced by a stringed game controller. For example, some stringed game controllers may not have frets (e.g., a game controller shaped as a violin), and the position of a user's hand on the controller may be detected using a pressure sensitive material, a resistive material on a fingerboard of the stringed game controller, or using any other suitable technique.

With regard to FIG. 1, a second type of signal (or component of a signal) produced by the apparatus 100 and provided as a gaming input to a gaming application may be a signal conveying timing information. For example, when the apparatus 100 is operated as a game controller, striking one or more of the strings 120 (e.g., plucking, picking, strumming, or otherwise striking) may generate a signal representing timing information. In some embodiments, the game controller may generate a separate output for each string. In other embodiments, only one output may be generated when any string is struck, however not all embodiments are limited in this respect.

Applicants have appreciated that determining the timing at which one or more of the strings 120 is played may be facilitated by damping the strings 120, to reduce or prevent extended vibration of the strings (irrespective of whether the damping alters the pitch or tone of the string), thereby facilitating determination of when string movement is caused by a new strike as opposed to extended vibration. Therefore, according to one non-limiting embodiment, the strings 120 may be damped when the apparatus 100 is used as a game controller.

If the strings 120 are to be damped, any suitable manner of doing so may be used, as the technology described herein is not limited to damping the strings 120 in any particular manner. For example, according to the non-limiting embodiment of FIG. 1, the apparatus 100 includes a mechanical vibration dampener 170 having an engagement surface for damping the strings 120. For example, the engagement surface of the dampener 170 may partially contact the strings 120, encapsulate the strings 120, or have any other suitable relationship to the strings 120 for damping them. According to one embodiment for use with a controller that can also operate as an instrument, the vibration dampener 170 may be retractable or removable in any suitable manner (e.g., may be recessed into the guitar body 128) when the apparatus 100 is being used as an instrument, e.g., an electric guitar. When the apparatus 100 is operated in a gaming mode, the vibration dampener 170 may be positioned (e.g., raised up from the guitar body 128) so that the engagement surface contacts (e.g., encapsulates) the strings 120 to reduce or prevent their harmonic vibration. The output signals from the guitar pickup 140 may then lack string vibration tonal components representative of harmonic vibration and instead may be used to represent one or more timing index components of one or more input signals to a gaming application (i.e., the time at which the strings 120 are moved). It should be appreciated that the positioning and type of dampener 170 described is only one non-limiting example, and that other structures and techniques for damping the strings 120 may be used. Other examples of mechanical dampeners are described below in connection with FIGS. 2 and 3. In addition, in some embodiments, dampening may be performed by signal processing, either alone or working together with some type of mechanical and/or electromechanical dampener, as described below.

It should thus be appreciated from the above discussion that, according to one embodiment, a game controller may produce one or more output signals representing timing information and positioning (e.g., fret positioning) information from the user's interaction with the strings of the stringed game controller. In some embodiments, the strings are used solely for generating timing information, and no pitch information is detected. Thus, according to this embodiment, processing of an output signal generated by striking one or more of the strings may not entail analyzing frequency information from the string vibration (e.g., pitch information), but rather may simply analyze whether a particular string is vibrating or not (i.e., whether a string has been struck). Thus, latencies associated with pitch analysis may be avoided in the signal processing stages. Also, according to this non-limiting embodiment, because the vibration of strings is not analyzed for pitch information, the strings of the stringed game controller need not be in tune to use the game controller, which may facilitate use of the apparatus as a game controller by users who are unable to tune the strings with sufficient precision to generate the proper pitch. In this embodiment, the fret or finger positioning information may be generated separately from any vibration of the string(s), for example by detecting contact of a string with a fingerboard, with a fret, or in any other suitable manner. Alternatively, in some embodiments, the pitch of a string may be detected and analyzed.

The apparatus 100 may further comprise a controller output module for processing received signals (e.g., one or more signals including the finger position component from the fret sensors or otherwise, and one or more timing index components from the guitar pickup 140, according to one non-limiting embodiment) independently of any string vibration tonal component to generate one or more corresponding controller output signals to provide to the computer gaming application. The controller output module may be within the guitar body 128, as in FIG. 1 (which is why the controller is not visible in FIG. 1), may be part of a module distinct from the apparatus 100, may be disposed partially within and partially outside of the apparatus 100, or may be implemented in any other suitable manner. The controller output module may have any suitable structure for processing the gaming input signals, one non-limiting example of which is shown and described below in connection with FIG. 7. The controller output signal in gaming mode may be output through the audio jack 150, or there may be one or more special game controller output ports such as a USB port 160, a wireless communications link through an antenna (e.g., using a protocol such as Bluetooth and a 2.4 GHz RF module or other wireless technology), or any other suitable arrangement. When configured with a wireless communications link, it may operate up to a 30 ft. range and still meet a 40 hour battery life specification, or may have any other suitable operating range and battery life, as the aspects described herein as relating to game controllers are not limited in this respect.

As mentioned, according to one aspect of the technology described herein, the strings of a stringed game controller may be damped to reduce or eliminate their vibration after being struck (e.g., plucked, picked, strummed, or otherwise struck). The damping of the string vibration signal can be accomplished by applying mechanical and/or electromechanical damping directly to the strings, by signal processing of the electrical signal from the pickup, by some combination of these techniques, or in any other suitable manner. According to one embodiment, the damping may be performed to facilitate use of the strings to provide a timing signal.

When mechanical damping alone is used, it may be desirable that any vibration of the strings be damped by a sufficient amount to facilitate detection of distinct strikes on the strings generated by a user. A user typically may play, or strike, the strings in the frequency range of 1-5 Hertz (Hz) (e.g., 1-5 strums per second) when playing a song, and the aspects of the invention described herein can be used with applications in which the user may strike the strings at that pace, a slower pace, or even faster. In some embodiments, the vibrations may be damped to exhibit a suitable amount of decay (also referred to as attenuation) to facilitate detection of distinct string strikes in a time less than the expected period between string strikes. For example, for some gaming applications it may be expected that a user will strum the strings of a stringed controller at a rate of approximately one strum per second (i.e., 1 Hz). Thus, according to some embodiments, the strings of a stringed game controller may be damped to ensure that any vibration of the strings is sufficiently attenuated in less than approximately one second to distinguish between ongoing vibration of the string from the initial strike and a subsequent string strike. According to some embodiments, a sufficient amount of attenuation may be on the order of 50% or more attenuation of the initial string vibration, approximately 60% attenuation, approximately 70% attenuation, approximately 80% attenuation, approximately 88% attenuation, approximately 90% attenuation, or approximately 95% attenuation. However, it should be appreciated that the various aspects relating to damping described herein are not limited to providing any particular amount of attenuation.

Furthermore, while a non-limiting example of an expected play rate is one strum/strike per second, it should be appreciated that other play rates may also be used, for example, as mentioned play rates of 1-5 Hz may be expected, or any other suitable play rate. Thus, according to some embodiments, a sufficient amount of damping (so as to achieve any of the amounts of attenuation listed above, or any other suitable amount) may be applied to distinguish between distinct string strikes in a time of less than approximately one second to less than approximately two tenths of a second (i.e., the time between strikes for play rates of 1-5 Hz). Moreover, according to some embodiments, a sufficient amount of damping may be applied to attenuate the vibration of a string by a sufficient amount (e.g., any of those amounts previously listed) in less than approximately half of the time period between expected string strikes (i.e., in less than approximately 0.1 seconds for a play rate of 5 Hz), in less than approximately one third of the time period between expected string strikes (i.e., in less than approximately 0.07 seconds for a play rate of 5 Hz), in less than approximately one quarter of the time between expected string strikes (i.e., in less than approximately 0.05 seconds for a play rate of approximately 5 Hz), or in less than any other suitable time. According to some embodiments, the strings of a stringed controller are damped to reduce any initial vibrations therein by approximately 90% or more (e.g., by approximately 98% in some embodiments) in approximately 25 milliseconds or less (e.g., one quarter of the time period between expected string strikes at a rate of approximately 10 Hz), however it should be appreciated that not all embodiments are limited in this respect.

Figure 2:
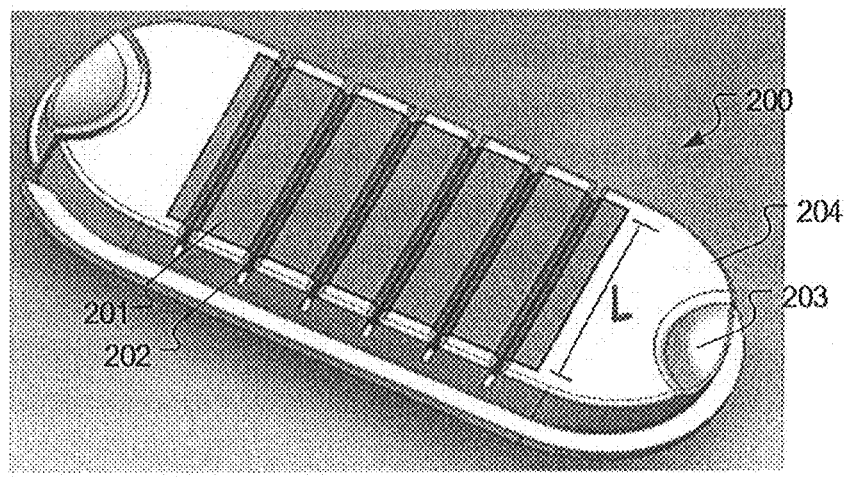
FIG. 2 shows one embodiment of a vibration dampening arrangement, according to one embodiment of the invention.

FIG. 2 shows specific details of one specific embodiment of a mechanical vibration dampener 200 which may be used to damp strings on a stringed game controller, such as the apparatus 100. For purposes of explanation, the operation of the dampener 200 will be described in connection with the apparatus 100 of FIG. 1. However, it should be appreciated that the dampener 200 (or one like it but modified, e.g., to handle a different number of strings) may be applicable to other stringed game controllers.

The dampener 200 includes an engagement surface 201 that may encapsulate the strings 120 to reduce or prevent harmonic vibration, for example to reduce or eliminate vibration from a strike in any of the time periods listed above (e.g., in less than approximately 1 second, less than approximately 0.1 seconds, less than approximately 25 milliseconds, or within any other suitable time). In the example shown, the engagement surface 201 has six string slots 202 which each receive one of the strings 120 when the vibration dampener 200 is raised into operating position for gaming mode. The engagement surface 201 may be a foam piece (e.g., Poron®), or any other suitable material for providing a desired amount of damping within a desired time. The length, L, of the engagement surface slot 202 may be long enough to ensure sufficient dampening of the strings 120. For example, the slot may be one inch or more in length in the direction along the strings 120, or may have any suitable length. The decay time constant of string vibration corresponds to the amount of time it takes for the string vibrations to dissipate and the vibration dampener 200 may reduce the decay time constant relative to an undampened string to as close to zero as practical (given mechanical and other constraints), to any of the other time periods listed above, or to any other suitable time period. For example, a foam piece with a slot at least an inch long may dampen the decay time constant of string vibration to less than 25 milliseconds. However, in other embodiments, a dampener may be employed that dampens less efficiently but is still effective to facilitate the detection of distinct string strikes.

In one embodiment, the engagement surface 201 may be easily replaceable and may be friction fit into an outer shell 204 (which may be formed of plastic or some other materials). Thus, according to one embodiment a user may select one of various options of materials for the engagement surface 201, where the different options have different characteristics (e.g., stiffness), and may switch between materials by removing one type and friction fitting a replacement into the outer shell 204. However, other constructions are possible. For example, the engagement surface may be not be fit into any outer shell in some embodiments, but rather may be formed and mounted in any suitable manner to perform its damping function In some embodiments, the vibration dampener 200 may include a dampening control mechanism, allowing it to be raised and lowered around the strings 120. For example, the dampener 200 may be raised around the strings 120 when the apparatus is used in game mode (i.e., as a game controller), and may be lowered from the strings 120 if, and when, the apparatus 100 is used in a guitar mode (i.e., as an instrument). The dampener 200 may be raised and lowered by squeezing two control ends 203 with thumb and forefinger, and may include a locking mechanism to secure it in correct position in accordance with one embodiment, but other arrangements are possible.

Figure 3:
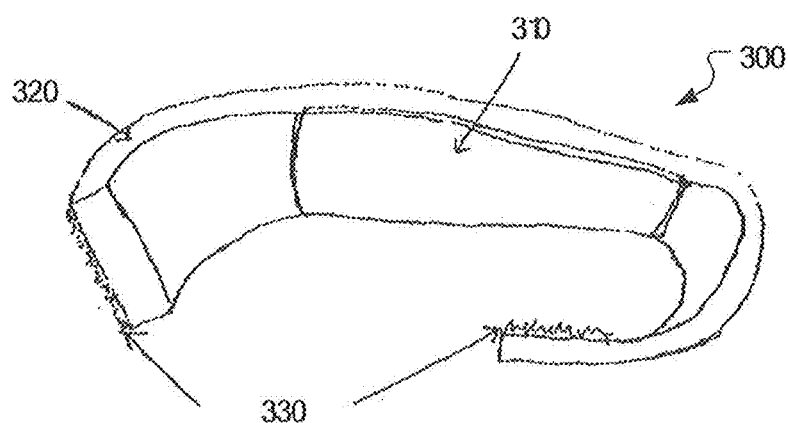
FIG. 3 shows another embodiment of a vibration dampener.

FIG. 3 shows another non-limiting embodiment of a vibration dampener 300. The dampener 300 includes a neck strap arrangement, in that it includes a flexible strap 320 made of a material, such as cotton, rubber, plastic, or any other suitable material, which stretches in a longitudinal direction, and which may wrap around the guitar neck 124 to mechanically couple a vibration dampening material, described below, around the neck. Flexible strap 320 may include a fastening material 330 (such as Velcro® or other fastening material) on the ends to facilitate fastening, or may include any other suitable fastening mechanism. Engagement surface 310, which may be coupled to the flexible strap 320 in any suitable removable or fixed manner (e.g., by gluing, sewing, or in any other suitable manner) may engage the strings 120 from above, and may be made of any suitable material (e.g., felt, rubber, or any other suitable material) for providing a desired amount of damping within a desired time (e.g., 70%, 80%, 85%, 90%, 95% or more attenuation in approximately 25 milliseconds or less or some other desired timeframe, depending on the rate at which users are expected to strike the strings). Additionally, in some embodiments, the engagement surface 310 may be formed of an electrically non-conductive material.

The vibration dampener 300 may be applied in any manner suitable for damping the strings 120 by the desired amount and within the desired time, but in some embodiments is not attached so tightly as to cause the strings 120 to contact the frets 130. Alternatively, a neck attaching vibration dampener 300 may be adapted to fit between the guitar strings 120 and the fingerboard 125 to engage the guitar strings 120 from below. For example, according to one embodiment, the dampener may include a piece of foam which is positioned between the fingerboard and the strings of the game controller, although other configurations are also possible. In some embodiments, the stiffness of the engagement surface 310 may be selected, for example from a plurality of options, to reduce the decay time constant of the string vibrations of the guitar strings 120. For example, the engagement surface 310 may be formed of a material removable from the flexible strap 320, so that a user may select one of various options of materials to use for the engagement surface 310, where the various options have differing degrees of stiffness. The vibration dampener 300 may be removed from the guitar neck 124 of apparatus 100 if the apparatus 100 is to be used as an instrument, e.g. as a guitar.

While FIGS. 2 and 3 illustrate two examples of dampeners which may be used with a stringed game controller to dampen the strings, it should be appreciated that other types and forms of dampeners may be used. For example, damping of the strings 120 may be performed electromechanically and/or though signal processing, or through any combination of the damping techniques described herein, as the various aspects relating to damping of strings of a game controller are not limited to use with any particular type of damping. Also, it should be appreciated that dampening may not be employed in embodiments in which the expected play rate (i.e., the expected frequency of string strikes) is sufficiently low that the vibrations of the strings would naturally attenuate by a sufficient amount to allow detection of distinct strikes, or in embodiments in which the processing of signals from the strings is sufficiently fast and/or accurate to distinguish between distinct string strikes without dampening.

Figure 20:
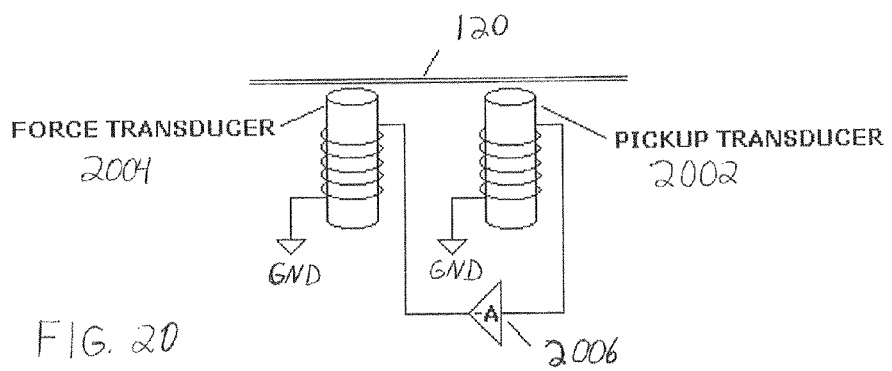
FIG. 20 illustrates an example of a configuration which may be used to provide electromechanical damping of strings, according to one embodiment.

FIG. 20 illustrates an example of a circuit which may apply electromechanical damping to one or more of the strings of a stringed game controller. The string 120 may be positioned proximate a pickup transducer 2002 and a force transducer 2004, each of which may be connected to ground (GND). The pickup transducer 2002 and force transducer 2004 may be coupled to each other via a negative feedback amplifier 2006, having a suitable gain of −A. Vibration of the string 120 may induce a voltage in the pickup transducer 2002, which is then amplified by the negative feedback amplifier 2006, and then applied to the force transducer 2004. The force transducer 2004 may then apply a restorative electromagnetic force to the string 120, damping the vibration of the string 120.

Figure 21:
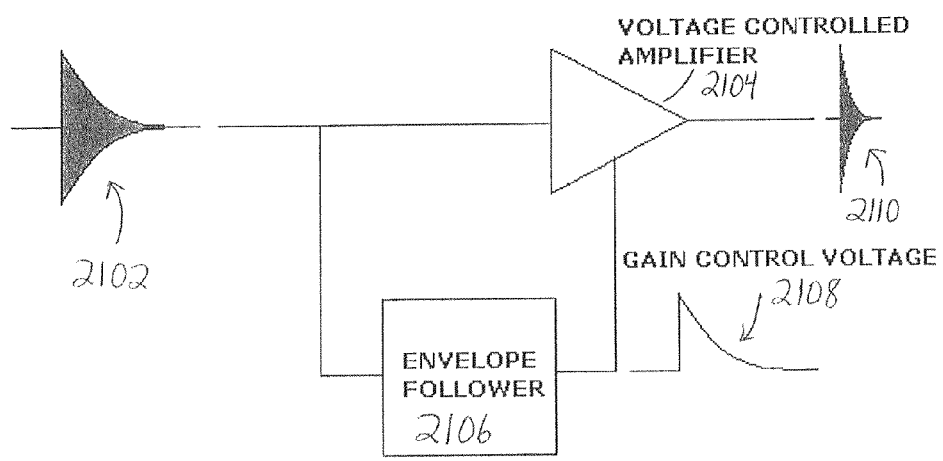
FIG. 21 illustrates an example of a circuit which may be used to alter the decay time of a signal representing a string vibration, to facilitate detection of discrete strum events, according to one embodiment.

FIG. 21 illustrates an alternative damping technique, in which vibration of the string is not itself damped, but a signal produced in a pickup is. As shown, an envelope 2102 of a signal generated by a vibrating string (e.g., a signal output by pickup 140 of FIG. 1) is input to both a voltage controlled amplifier 2104 and an envelope follower 2106. The output 2108 of the envelope follower 2106 therefore follows the envelope 2102 of the input signal and functions as a gain control voltage for controlling the gain of the voltage controlled amplifier 2104. The output envelope 2110 of the voltage controlled amplifier may exhibit a shorter decay period than that of the envelope 2102, even though the vibration of the string itself may not be damped. The output envelope 2110 may therefore be used to detect strikes occurring closer together in time than could the envelope 2102. It should be appreciated that other methods of processing output signals from a pickup may also be used to shorten the decay time of the signal, and that the aspects described herein relating to damping string vibrations are not limited to using any particular method of damping.

As explained above, according to one embodiment, one type of output signal generated by a stringed game controller, which may be provided as an input to a gaming application, is a signal indicative of one or more fret positions of the user's fingers on the game controller. The fret position information may be detected in any suitable way. For example, referring to FIGS. 4A-C, a signal may be developed by making the frets 130 and the strings 120 of electrically conductive material, and connecting such electrically conductive frets 130 to a fret wiring ribbon 400 that runs under (or along, or within) the fingerboard 125. Such frets 130 may be made of any suitable electrically conductive material, such as steel (for example, 18% Nickel-Silver fret wire) or any other material with suitable electrical and mechanical properties. According to some embodiments, the frets 130 are made of a material that resists coloration and rust, although the various aspects relating to game controllers described herein are not limited in this respect.

The frets 130 may be securely attached to the fingerboard 125 by any suitable means such as individually by ultrasonic welding, and may be trimmed for size using snips or in any other manner. The fret wiring ribbon 400 may be, for example, a 20 gauge 6-position ribbon cable terminated in a PCB connector 402 that connects to the controller output module of a stringed controller or may be any other suitable connector. As shown in FIG. 4C, from the fret wiring ribbon 400 an individual wire may be crimped to a vertical fret connector 401 (e.g., 0.1 pitch) for each of the first several frets, for example for the first five frets, or for any other number of frets. The fret wiring ribbon 400 may run within the guitar neck 124 alongside any internal structural components, such as a brace discussed below, or may be positioned in any other suitable manner, such as along the outside of the neck 124, or in any other suitable manner.

While one example of a gaming input signal representation of finger position along the neck of the controller is generated by detecting the contact of a string 120 to a fret 130, it should be appreciated that other techniques may be employed for detecting finger position along the neck of the controller. For example, part or all of the fingerboard 125 may be formed of a pressure sensitive material, such that an electrical signal may be generated when a particular area of the fingerboard is pressed by a string or a user's hand. The pressure sensitive material may comprise one or more sections, for example corresponding to frets or to each of the strings. Alternatively, a resistive material may be formed to define a single area or many areas (for example to correspond to frets) on the fingerboard 125, from which an electrical signal is generated when a string or finger is contacted to the fingerboard 125. These alternate techniques can be used for fretted or non-fretted controllers. Thus, it should be appreciated that the various aspects relating to stringed game controllers are not limited to generating an indication of a user's hand position in any particular manner, or for that matter to even generating an indication of a user's hand position.

As discussed above, stringed game controllers, such as the apparatus 100 in FIG. 1, may be used to provide inputs to a gaming application. The apparatus may therefore comprise one or more features making it compatible with the gaming application. For example, the apparatus 100 may include control features specifically for interaction with a computer (such as a personal computer or a Mac® from Apple®, Inc.), a gaming console (e.g., an Xbox 360® from Microsoft® Corporation, Playstation® from Sony®, PS3® from Sony®, a Wii® from Nintendo® or any other gaming console), or any other type of device with which the apparatus may want to communicate, either for gaming purposes, sound processing purposes, amplification purposes, learning purposes, or any other purpose.

In the non-limiting example of FIG. 1, the apparatus 100 comprises an analog joystick 185 that may be used in the normal manner of a computer game joystick (and which in some embodiments may alternatively be a digital joystick), and a sync button 186 for wireless synchronizing of the apparatus 100 to a game console (for example for multi-player games, or for any other purpose). According to one embodiment for use with multi-player applications, player indicator LEDs within the sync button 186 light up to indicate which player number the controller has been assigned (Player 1, Player 2, Player 3, or Player 4). While a joystick and a sync button are two non-limiting examples of the types of features which may be added to, or adapted on, a device to facilitate compatibility of the device with a gaming system, it should be appreciated that other types of features, such as dials, knobs, and direction buttons (e.g., 4 direction keypads and 8 direction keypads) may also be used, or any other suitable features.

The volume control 152 and tone control 154 may both be multi-function potentiometers with a center detent position or may be implemented in other ways. Their functionality may be specific to whether the apparatus 100 is in game mode (i.e., being used as a game controller) or guitar mode (i.e., being used as an instrument), which modes may in some embodiments be selected by a user from menu options of a gaming application visual display, or in any other suitable manner. In game mode, the volume control 152 may act as a select/back button that the player presses, for example, to highlight different menu options or to move backwards in a game menu system. Twisting the volume control 152 in game mode may have no effect. In guitar mode, the volume control 152 may be turned to act as a conventional volume control for the output signal from the guitar pickup 140, and pressing it may have no effect. The tone control 154 similarly controls the tone of the pickup output signal in guitar mode. In game mode, the tone control 154 may act as a pressable start switch to activate a game function, and turning the control has no effect.

The ways in which the instrument controls (e.g., the volume and tone knobs) can be adapted to control a game discussed above are just an example, as the instrument controls can be adapted to control a game in any suitable manner. In addition, while some examples of features making apparatus 100 compatible with gaming applications have been described, it should be appreciated that such examples are non-limiting. Stringed game controllers according to aspects of the technology described herein may have any number and type of features (e.g., buttons, knobs, dials, ports, joysticks or any other features) making them compatible with any particular gaming application. The number, type, and functionality of such features may depend on the gaming application itself, e.g., the types of input signals the gaming application receives from a user to operate. Thus, the various aspects of stringed game controllers described herein are not limited to including any particular number, type, or function of features to be compatible with a gaming application.

As mentioned above, conventional instruments, such as guitars, are typically assembled from various wooden or composite material components which are connected together. Each component piece is individually strong and rigid. Various features of such a conventional guitar are adjustable so that the surfaces and angles of the neck, fretboard, frets, and pickup can be adjusted to be in correct relationship to the strings over time (e.g., as the materials expand or contract due to temperature and/or humidity, or other reasons). Typically, this is based on an adjustable bridge arrangement at the base of the guitar body where the strings terminate. By raising, lowering and tilting the different sections of the adjustable bridge, the strings can be correctly positioned over the other components.

As discussed above, Applicants have appreciated that it may be desirable to create instrument-shaped controllers out of material which cannot withstand the loading forces imposed by strings without bending to an unsatisfactory degree or breaking. For embodiments wherein the controller is a dual use device capable of use as an instrument, such devices, if they did not break entirely, may require frequent tuning or adjustment, and be unable to hold tune with sufficient precision to enable it to be used as an instrument. Applicants have appreciated that a brace (alternatively referred to herein as a stringer or support) may also or alternatively be used to support an instrument and/or an instrument-shaped game controller made of material(s) (e.g., lightweight plastics or other materials) that would not otherwise be sufficiently strong to withstand the loading force of strings. The brace structure may be in the form of a stiff metal bar structural member, or any other suitable bracing structure, that provides structural support for the device, for example as the backbone provides structural support in a human.

Applicants have appreciated that the amount of adjustment of a stringed instrument needed to maintain the instrument in tune and/or to maintain the strings at a proper positioning relative to the other components of the instrument may be reduced or eliminated by use of a brace. Thus, according to some embodiments of the technology described herein, a stringed instrument (which may optionally serve as a game controller) may be constructed as a substantially adjustment-free device which may be provided to the customer with the strings already correctly positioned and ready to use without the need for adjustments, such as bridge adjustments.

As should be appreciated from the foregoing, according to one aspect of the technology described herein, a stringed device comprises a brace connected between the two ends at which the strings of the device are fixed, to support the structure in withstanding the force of the strings and/or to minimize or eliminate alterations in the relationship between the ends of the strings. For example, in a guitar, the strings are typically fixed between the head or nut and the bridge. Therefore, according to one embodiment, a brace may be provided to support the guitar from the head or nut to the bridge, for example to maintain the strings in a proper position. In some embodiments, one end of the brace is connected to the nut, or the head of a guitar-shaped device, and a second end of the brace is connected to the bridge. The brace may be formed of any suitable bracing material for withstanding a loading force applied on the stringed device by strings, which, for example, may be approximately 150 pounds to 200 pounds for light gauge guitar strings, but which may vary depending on the string characteristics. The brace may be formed of metal, wood, plastic, or any other sufficiently strong material, and may take any suitable shape that, together with the material, provides the desired level of support. In this respect, the desired level of support may vary depending on the application. For example, when the apparatus is to be used solely as a game controller and is not intended to be used as an instrument, the level of support may be one to simply prevent the device from deforming or breaking, as keeping the device properly tuned may not be an issue when it is not intended to be played as an instrument. In addition, for embodiments wherein the apparatus is intended to be usable as an instrument, while desirable to provide a level of support to make the instrument adjustment-free, it is not necessary in all embodiments.

Figure 5:
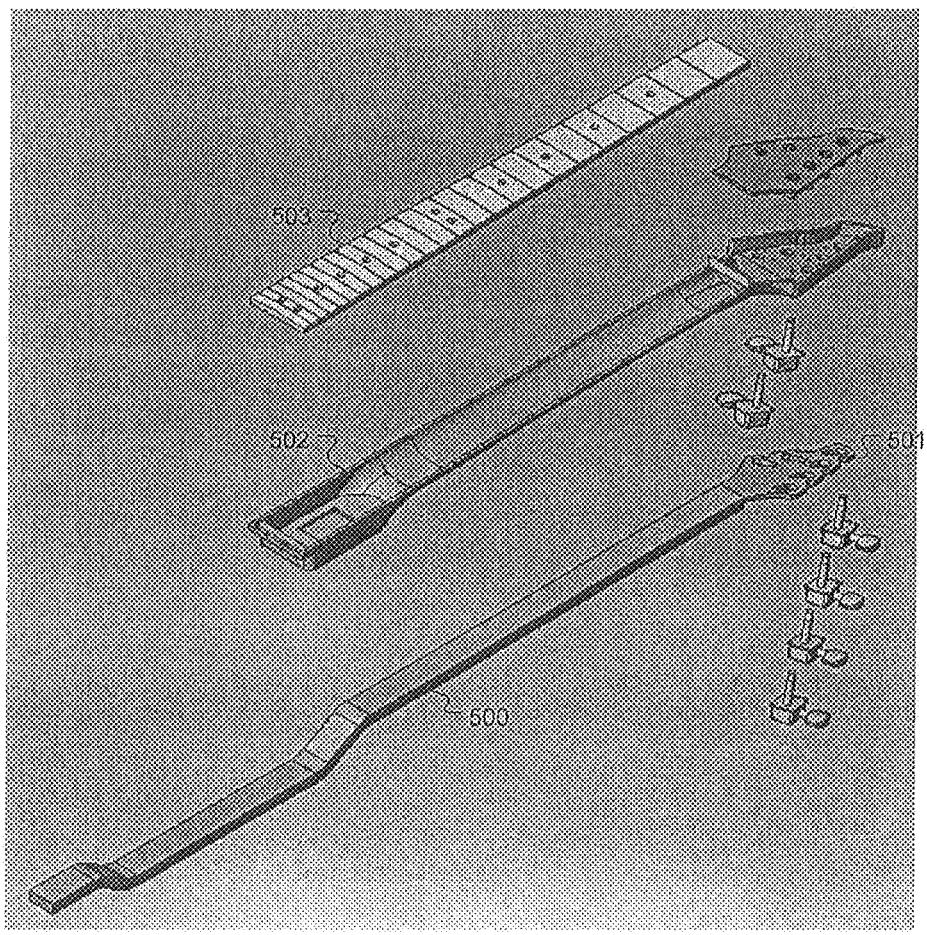
FIG. 5 shows details related to use of a brace according to an embodiment of the present invention.

FIG. 5 shows one specific example of a brace 500 in the specific form of a solid bent steel bar which runs from the head end of a stringed device, such as guitar-shaped apparatus 100 of FIG. 1, down through the guitar body, and which provides structural support for the device. The brace 500 may provide the structural strength to withstand the loading force of the guitar strings, which may be around 250 pounds in some embodiments. While steel is used as the material for the brace 500 in one embodiment due to its combination of strength, availability, and low cost, it should be appreciated that any suitable bracing material may be used. In the embodiment shown, the neck head 501 is a separate steel stamping that is welded onto the neck end of the brace 500, and the neck 502 is a plastic part that is placed onto the brace 500 which allows the finger board 503 to snap in. However, the aspect of the invention relating to a brace is not limited to such a configuration, and it should be appreciated that the braces described herein for supporting stringed devices are not limited to any particular shapes, materials, methods of fabrication, or methods of attachment.

Figure 6:
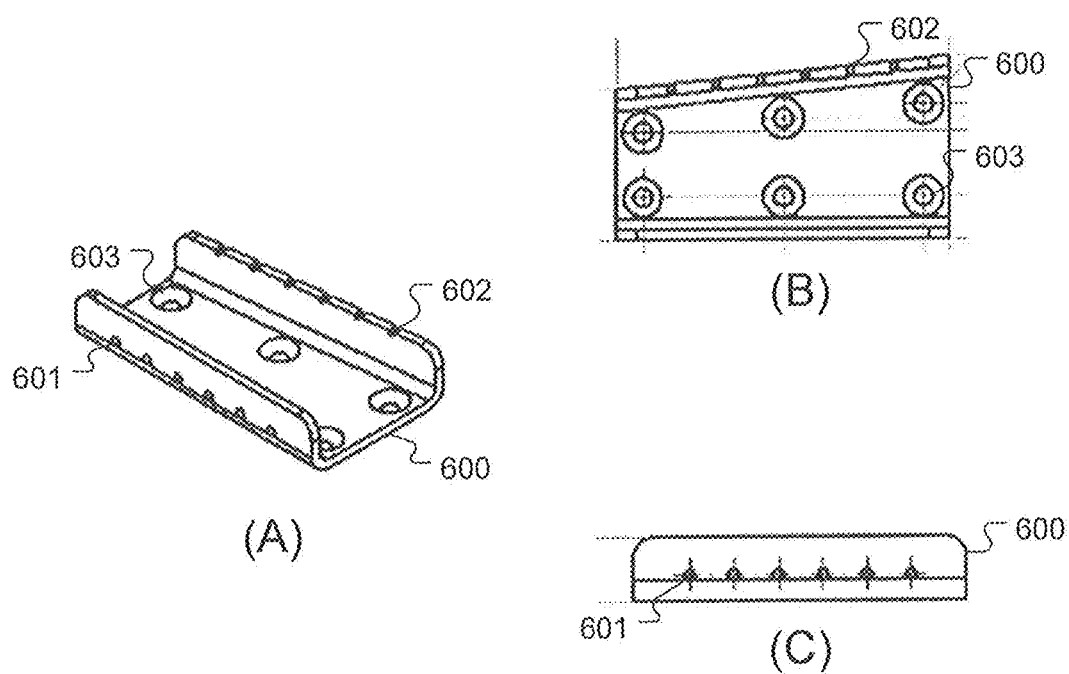
FIGS. 6 A-C show structural details of a non-adjustable bridge for the apparatus of FIG. 1, according to one embodiment of the invention.

As discussed above, in some embodiments, with the use of a brace, such as brace 500 above, an adjustment-free stringed device, such as a guitar or guitar-shaped game controller, may be provided. For purposes of illustration, such a device is described in relation to a guitar, such as apparatus 100 in FIG. 1, though it should be appreciated that the concept of a substantially adjustment-free stringed device may apply to other types of stringed instruments, and/or instrument-shaped controllers. According to one embodiment, the device may include a non-adjustable bridge. The non-adjustable bridge may be implemented in any suitable manner, an example of which is the non-adjustable bridge 600 shown in FIGS. 6A-6C. The non-adjustable bridge may facilitate maintaining a non-adjustable correct relationship between the fingerboard and the strings. For example, the non-adjustable bridge 600 may terminate the body end of the strings 120 after they have passed over the guitar pickup 140. In this non-limiting embodiment, the bridge 600, which may be made of steel or any other suitable material, secures the ends of the strings 120 in anchor holes 601. In this embodiment, the bridge 600 includes mounting holes 603 for connecting the bridge 600 to the guitar body 128. The non-adjustable string slots 602 elevate the strings 120 to a desired or optimum height above the guitar pickup 140 and frets 130 Because of the unvarying rigid structure imparted to the instrument and/or controller (e.g., the apparatus 100) in this non-limiting embodiment by the brace 500, little or no user adjustments may be needed to the bridge 600, or any other components, to achieve satisfactory string placement. Thus, the device may be immediately ready for use when purchased and not require tuning by the user.

While some embodiments of the technology discussed herein related to an adjustment-free device can be used in connection with a dual mode instrument and game controller, it should be appreciated that these aspects of the technology described herein can be used with instruments that do not have any of the techniques described herein that enable their use as a game controller, and can be used with a dedicated instrument and/or with a dedicated game controller.

Figure 7:
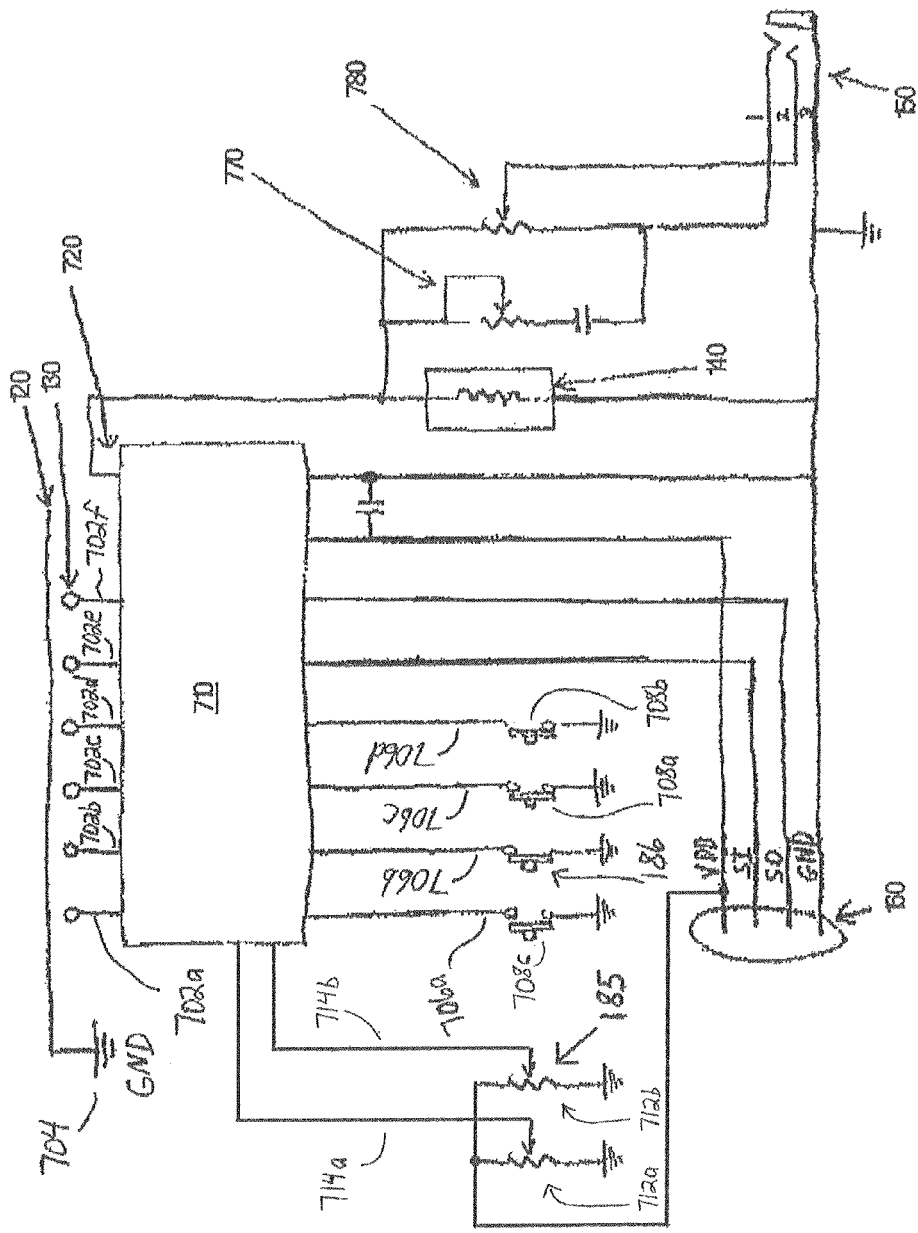
FIG. 7 shows a controller output module according to one embodiment of the present invention.

As mentioned above, a stringed game controller in accordance with some embodiments may include a controller output module for processing signals based on user interactions (e.g., signals generated when strings 120 contact the frets, signals from the pickup 140 based on string strikes, etc.) and providing such signals to a gaming application. FIG. 7 is a circuit diagram of one non-limiting example of a controller output module 710, which may be implemented, for example, by a digital processor running firmware, and/or any other suitable combination of hardware, firmware, and software, as the embodiments described herein relating to game controllers are not limited to use with any particular type of controller output module. According to some embodiments, the controller output module 710 may include any suitable processing device, such as a microcontroller and/or programmable logic (e.g., a field programmable gate array (FPGA)), or any other suitable processing device. As mentioned previously, the output module may be within the stringed controller (e.g., within the guitar body 128 of apparatus 100), or in any other suitable location.

In the embodiment shown in FIG. 7, each of input pins 702a-702f of the controller output module 710 is electrically connected to the respective frets 130 of the apparatus 100, and generates an input signal indicating that a fret is contacted by a string 120. The electrical connection may be direct as shown, or it may be via intermediary electronic devices, such as resistors, capacitors, transistors, or the like, or via non-wired media. The strings 120 are electrically connected to the ground pin 704 of the controller output module 710. When a string 120 contacts a guitar fret 130, a circuit to ground is closed and a small current (e.g., 5 mA or any other suitable current) runs to ground 704 through the string 120. The corresponding input pin 702a-702f connected to the fret 130 contacting the string 120 is therefore connected to ground, and the voltage on that input pin may therefore drop. The drop in voltage on the input pin may be detected by the controller output module 710, which may therefore generate a signal directly or indirectly resulting in a gaming input signal, which information may then be relayed to an external processor and/or external gaming application. As discussed above, the gaming input signal may be relayed through the USB port 160 (which in the non-limiting example of FIG. 7 is illustrated as having four signal lines, corresponding to a power supply line (VDD), a ground line (GND), a serial input line (SI), and a serial output line (SO)) or in any other suitable way. It should be appreciated that the form of USB port 160 shown is not limiting, and that signals from the controller output module 710 may also or alternatively be provided to an external device, such as a computer or gaming console, in ways other than using a USB port (e.g., using a PS/2 connector or in any other suitable manner). While FIG. 7 illustrates one circuit configuration by which connection of a string 120 to a fret 130 may be detected, it should be appreciated that other configurations are possible, and that the various features described herein relating to stringed game controllers are not limited in this respect. Also, in some embodiments, multiple signals can be generated for each fret (e.g. with one signal per string contacting a fret or one signal representing contact by any contribution of two or more strings).

Figure 8:
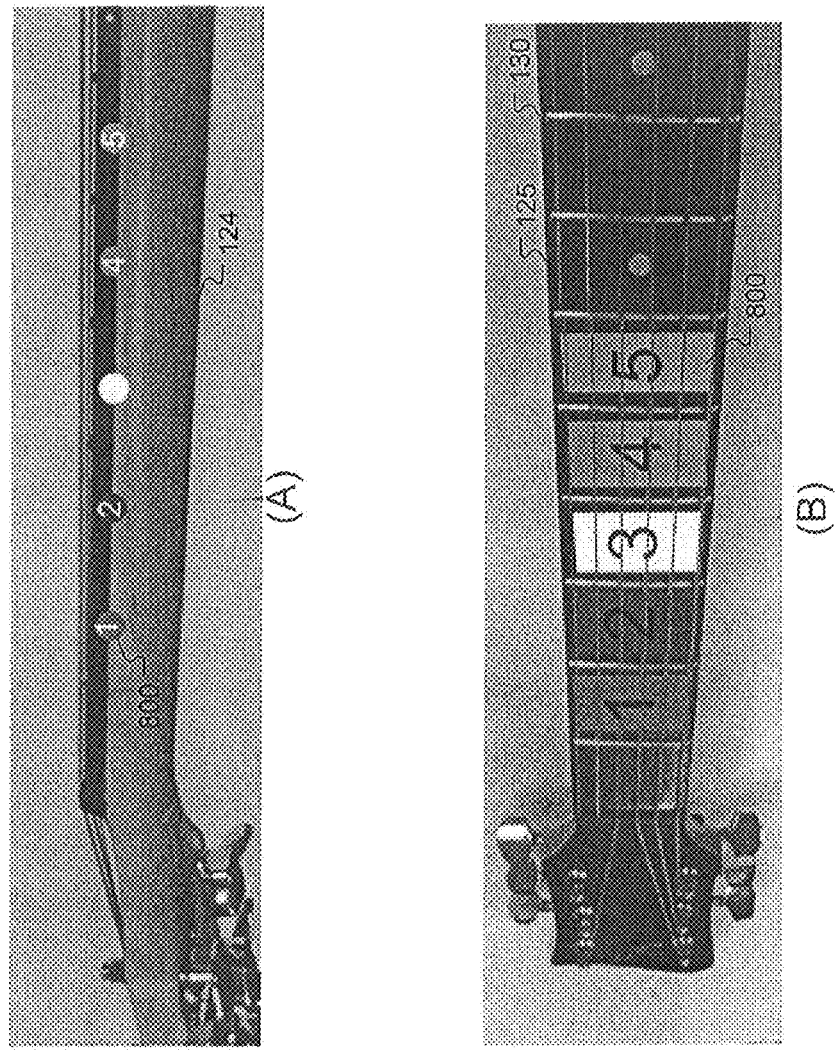
FIGS. 8 A-B show color and number coding of the neck frets on the apparatus of FIG. 1, according to one embodiment of the invention.

Embodiments of the stringed game controller (e.g., apparatus 100 in FIG. 1) may incorporate a suitable scheme for providing indicia to the user for use in developing the component of the gaming input signal indicative of a user's hand position or fret position. For example, a visual clue may be provided (such as a color coding scheme, a number coding scheme, a symbolic coding scheme, an icon coding scheme, etc.), a tactile scheme may be employed, any combination thereof, or any other suitable type of scheme may be employed. The elements of the scheme (e.g. the numbers in a number coding scheme) may be positioned on, or incorporated with, any suitable part of the apparatus 100, such as on the frets 130, the fingerboard 125, the neck 124, or any other suitable part of the apparatus. For example, FIGS. 8A-B show that there may be color coding and/or numbering along the neck 124 and/or on the face of the fingerboard 125. In some embodiments, together with such a coding scheme, a user interface for the gaming application (e.g., a visual display screen) may use corresponding indicia (e.g., colors/numbers) that directly match the indicia on the apparatus or are correlated in some manner) to communicate the inputs the user should be performing (e.g., strum timing and direction, string fingering, etc.).

The gaming input signal(s) from the apparatus 100, (e.g., from the frets 130, string strikes, etc.) may be updated to reflect user interaction in any suitable manner. For example, in those embodiments in which one of the gaming input signals (or one of the components of a gaming input signal) reflects whether a string is contacting a fret, different monitoring schemes may be employed. For example, in one embodiment, the strings 120 are all connected to ground simultaneously and each fret 130 is connected to a corresponding input pin of the controller output module (e.g., input pins 702a-702f of the controller output module 710), so that whenever a string contacts a fret, a signal is generated on the corresponding input pin of the output module. In an alternative embodiment, one or more of the strings 120 are alternately grounded (i.e., alternately connected to ground 704) so that a signal is generated on the corresponding input pin of controller output module 710 only if a string is contacting a fret at the same time that the string is electrically grounded, effectively meaning the strings are individually monitored at different times. In this latter monitoring scenario, which string 120 is connected to ground may be alternated rapidly, or at any suitable rate, either sequentially or in any suitable order to poll the strings individually for signals thereon. It should also be appreciated that the two monitoring schemes described above for monitoring signals generated when a string contacts a fret are non-limiting, and that other monitoring schemes may be employed.

In another embodiment, one or more of the frets 130 may be sub-divided into a number of (e.g. six) spaced electrically isolated segments each corresponding to one of the strings 120. In such a configuration, each segment of the frets 130 may be configured to allow separate detection of when it is contacted by a string (as opposed to the fret generating a single signal when contacted by any string), for example by modifying the electrical connection scheme of FIGS. 4A-4C to add connections for each of the six segments of the frets of interest (e.g. by adding additional wiring ribbons), or in any other suitable manner. It should be appreciated that in this embodiment contact of specific individual strings with each fret 130 may be determined, which may be desirable in some applications where it is desired to increase the number of possible inputs from the user and/or to challenge the user to interact with the stringed controller in a manner more realistic to playing the corresponding instrument by detecting precisely which string contacts a fret. However, as discussed above, not all embodiments are limited in this respect and others need not differentiate between which strings contact a fret or are otherwise fingered by the user.

As mentioned above, in some embodiments, a stringed game controller may include interfaces or controls in addition to the strings for interfacing with a gaming application. As discussed above, examples of such interfaces or controls may include an analog joystick 185 and sync button 186 shown in FIG. 1, or any other suitable features (e.g., directional keypads, knobs, dials, or any other features). In some embodiments, the signals produced by the additional interfaces or controls may be processed by the same output control module that processes signals from the strings, but the embodiments of the invention described herein are not limited in this respect. The signals from any additional controls can be detected and processed in any suitable manner, as the aspects of the invention described herein are not limited in this respect.

As one example, as shown in FIG. 7, additional computer gaming application controls, for example in the form of a button (e.g. sync button 186) and a joystick (e.g., joystick 185), may be connected to the controller output module (e.g., controller output module 710). The sync button 186 is represented by a switch, and may be connected between ground and an input pin 706*b* of the controller output module so that when activated the controller output module 710 detects a drop in voltage at input pin 706*b* and relays information indicating that the control has been activated to an external processing device or external gaming application in any suitable manner (e.g. through the USB port 160). It should be appreciated that the three additional input pins 706*a*, 706*c* and 706*d* are shown as being connected to switches 708*a*, 708*b*, and 708*c*, which switches may correspond to additional controls on the game controller (e.g., apparatus 100) not shown in FIG. 1, but which may be included in some embodiments. The joystick 185 has been described as an analog joystick, and therefore may be implemented using two potentiometer tracks 712*a* and 712*b*, which may be connected to ADC input channels 714*a* and 714*b* of the controller output module 710, respectively. However, it should be appreciated that the joystick 185 may be implemented in any suitable manner, and may alternatively be a digital joystick suitably implemented. It should also be appreciated that other configurations for the computer gaming application controls are also possible, as any number (including zero) of additional interfaces or controls may be provided on a stringed controller according to some embodiments.

As previously explained, according to one embodiment, a stringed game controller (e.g., apparatus 100 in FIG. 1) may generate an output signal, or a component of an output signal (it should be appreciated that for purposes of this application separate components of a single signal may be considered to be separate signals, and vice versa), indicative of the timing at which strings are struck, which may be provided as a gaming input signal to a gaming application. This timing information can be generated based on user interaction with the stringed controller in any suitable manner. For example, according to one embodiment for use with the output module of FIG. 7 and the guitar shaped controller 100 of FIG. 1, to develop this timing index component of the gaming input signal, the controller output module 710 of FIG. 7 may include an internal analog to digital converter (ADC) module having an input pin 720 that is connected to sample the voltage across the guitar pickup 140. The ADC module may operate at a sampling rate of about 5 to 6 KHz, or at any other suitable sampling rate. The guitar pickup 140 may be a transducer that converts movement and vibrations in the strings 120 into a voltage signal across its terminals. For example, the pickup 140 may include one or more permanent magnets wrapped in one or more wire coils which possess an associated magnetic field. When the strings 120 move relative to the magnets of the pickup 140, they may change the magnetic field, which induces electric currents in the coil and a corresponding voltage across the terminals of the pickup 140, which may be sampled by the ADC module. The output signal of the ADC module may then be processed in any suitable manner, one example of which is described below in connection with a strum detector, to determine whether a string has been struck and thereby derive a signal indicative of the timing of string strikes.

As mentioned, some embodiments of a stringed game controller may include a dampener to dampen vibrations of the strings 120. When engaged, the vibration dampener may remove some or all of the frequency tonal components of the string vibrations and may greatly reduce the time constant of decay for those vibrations, thereby making it easier to detect string strikes. It should be appreciated that the timing index component of the gaming input signal may be developed in other manners (including from string controllers other than the guitar-shaped controller 100 of FIG. 1 and using a different output module from that shown in FIG. 7), and that the example described above is non-limiting.

In the non-limiting example of FIG. 7, the guitar pickup 140 is also connected to circuitry to enable the apparatus 100 to operate in a mode where it can be played as an instrument. This may be achieved in any suitable manner and the aspect of the invention that enables the stringed controller to also operate as an instrument is not limited in this respect. In one non-limiting example, the guitar pickup is connected in parallel with a tone control circuit 770 and a volume control circuit 780 when the output jack 150, which may be a standard ¼ inch phone jack or any other suitable connection, is connected to an external guitar amplifier. The volume control circuit 780 may be an adjustable voltage divider implemented with a potentiometer that may be manually adjusted by turning the volume control 152. Tone control circuit 770 may include a capacitor in series with a potentiometer with one terminal shorted to the middle terminal, allowing it to function as an adjustable resistor. The tone control circuit 770 may be in parallel with the volume control circuit 780 and may provide an alternate path to ground with an impedance that decreases with increasing frequency due to the capacitor, thereby operating as a low-pass filter by attenuating high frequency voltage signals from the guitar pickup 140 relative to low frequency signals. The cutoff frequency of this low-pass filter may be adjusted manually by turning the potentiometer, via tone control 154, to change the resistance in series with the capacitor, or may be adjusted in any other suitable manner. As mentioned above, the aspects of the invention are not limited to use with any particular type of volume control or tone control circuit, or even to use with a device that includes volume or tone controls.

It should be appreciated that input pin 720 presents a high input impedance, so that current flowing on the pin is small relative to current that flows through the tone control circuit 770 and volume control circuit 780 when the output jack 150 is connected. When the output jack 150 is disconnected, the tone control circuit 770 and volume control circuit 780 are open circuits, in which case the only electrical loading on the guitar pickup 140 is the input impedance of the ADC module.

As discussed above, according to some embodiments, user strikes of the strings 120 are detected via any suitable combination of hardware, software and/or firmware (e.g., via the controller output module 710). For example, according to one embodiment, the controller output module 710 includes an ADC module which receives an analog signal from pickup 140 and converts it to a digital signal. The controller output module 710 may then filter a resulting digital signal from the ADC module to detect user strikes of the controller strings (e.g., strings 120 in FIG. 1) as discrete events independently of string vibration tonal components. The digital signals from the ADC module may be low pass filtered to obtain an estimate of the envelope of the signal from the pickup 140. According to another embodiment, the output of the ADC module may be rectified by a full-wave rectifier and then filtered by a peak detection filter to create the envelope of the signal from the pickup 140. This envelope estimate may then be compared to different thresholds based on the current state of a strum detector module implemented in the controller output module 710, with different thresholds being used to determine when a strum has occurred. A vibration dampener, examples of which were previously described, may facilitate detection of such string movements as discrete timing index events, since reducing the decay time constant for string vibrations may facilitate resolving individual string strikes. The specific processing discussed above to detect string strikes is provided only as one non-limiting example, as other manners of identifying discrete string strikes and timing index events are also possible, and the embodiments of the invention described herein are not limited to using any particular technique.

Furthermore, it should be appreciated that various pickup scenarios may be employed. For example, a single pickup (e.g., pickup 140) may be used to detect string vibration from any of the strings of a stringed controller or instrument (e.g., strings 120 of apparatus 100). In such a scenario, the pickup may have a single output signal, such as shown in FIG. 7, and a single ADC channel may be used. The sampling rate of the ADC channel may be chosen to be higher than the highest expected string vibration frequency, or any other suitable value.

However, according to another embodiment, a pickup may be used to detect vibrations of individual strings, as opposed to detecting the vibration of any of the strings of the device. For example, referring to the apparatus 100 of FIG. 1, a 6-way pickup (referred to as a "hex" pickup) may be employed, such that detection of vibrations may be individually detected from any of the six strings 120 shown. In such a scenario, the controller output module (e.g., controller output module 710) may include an ADC channel for each of the pickup channels (i.e., six ADC channels in the example in which a 6-way pickup is used). In those embodiments in which multiple ADC channels are used, the multiple channels may be realized by multiple dedicated ADC hardware channels, by a single ADC with a multiplexer having an input for each output of the pickup (i.e., a multiplexer with six inputs in the example in which the pickup is a 6-way pickup), or in any other suitable manner, as the various aspects are not limited in this respect. Other types of pickups are also possible, and the various aspects relating to detecting vibrations of the strings of a stringed device are not limited to use with any particular pickup configuration.

The processing of signals from the pickup of a stringed game controller or instrument to detect discrete strikes of the strings may be accomplished in any suitable manner. According to some embodiments, a strum module may be employed to analyze the envelope of the output signal from the pickup, the envelope being created by filtering the output signal of the pickup, or in any other suitable manner. The strum module may include two or more states which may be used to identify when a strum is initiated, and when the vibrations from the strum are sufficiently attenuated to conclude that subsequent vibrations of the strings are due to a subsequent strum. It should be appreciated that while the term "strum" is used in this context, the applicability of the methodologies described is not limited to scenarios in which multiple strings of the instrument are played in a single upward or downward stroke, but rather may apply equally well to detecting strikes of individual strings. Thus, the terms "strum" and "strike" may be used interchangeably in this context.

Figure 9:
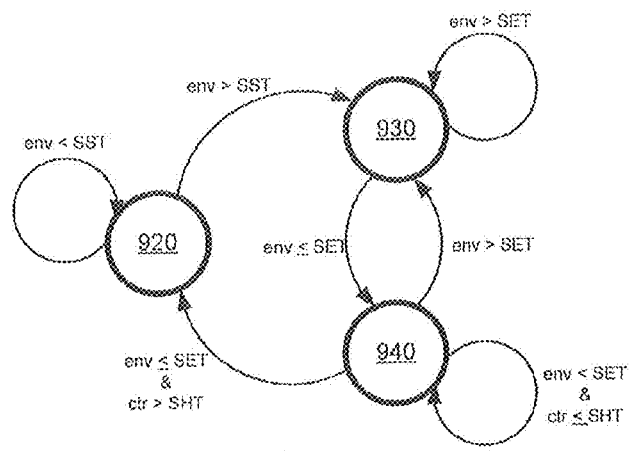
FIG. 9 shows the state arrangement of a strum detector module, according to one embodiment of the invention.

FIG. 9 illustrates a non-limiting example of the different states of a strum detector module (e.g., implemented in the controller output module 710) according to one embodiment of the invention. In the embodiment of FIG. 9, a strum detector module has three states, including a strum high state, a strum low state, and a no strum state. In the no strum state 920, the strum detector module outputs a logic low signal (e.g., a logic "0"), and repeatedly compares the current estimate of the signal envelope of interest to a strum start threshold (SST). As described above, the signal of interest may be the signal from pickup 140, and the estimate of the signal envelope may be generated by low pass filtering the digital version of the signal from pickup 140, which digital version may be provided by the ADC module of the controller output module 710. However, other methods of developing the envelope are possible, and in some embodiments no envelope may be generated, as any suitable signal representing the output of the pickup 140 may be used. If the envelope (abbreviated as "env" in FIG. 9) is greater than the SST, the strum detector transitions to the strum high state 930, and outputs a logic high signal (e.g., a logic "1"). Otherwise, the strum detector remains in the no strum state 920. In the strum high state 930, the strum detector module repeatedly compares the estimate of the signal envelope to a strum end threshold (SET). If the envelope is greater than the SET, the strum detector module remains in the strum high state, and continues to output the logic high signal. Otherwise, the strum detector module transitions to a strum low state 940 and starts a counter (abbreviated as "ctr" in FIG. 9) to measure time elapsed in the strum low state 940. The strum module continues to output the logic high signal while in the strum low state.

While in the strum low state 940, the strum detector module repeatedly compares the estimate of the signal envelope to the SET. If the envelope is greater than the SET, the strum detector module transitions to the strum high state 930, and continues to output the logic high signal. Otherwise, the strum detector module compares the value stored in the counter to the strum hold time (SHT). If the counter value is greater than the SHT, the strum detector module transitions to the no strum state 920, and outputs a logic low signal. Otherwise, the strum detector module remains in the strum low state 940.

Information about the current state of the strum detector module may be transmitted to an external device or application via the communications port 160 at various times, or via any other suitable technique. For example, strum detector state information may be sent in response to a state transition. Alternatively or additionally strum detector state information may be sent periodically to an external device or application. Also, it should be appreciated that other manners of strum detection are possible, and that FIG. 9 merely provides one non-limiting example. For example, the number of strum states, and their significance (e.g., the significance of a transition between states) may be varied, as the embodiments described herein relating to detection of distinct strum/strike events is not limited to using any particular detection algorithm.

Figure 10:
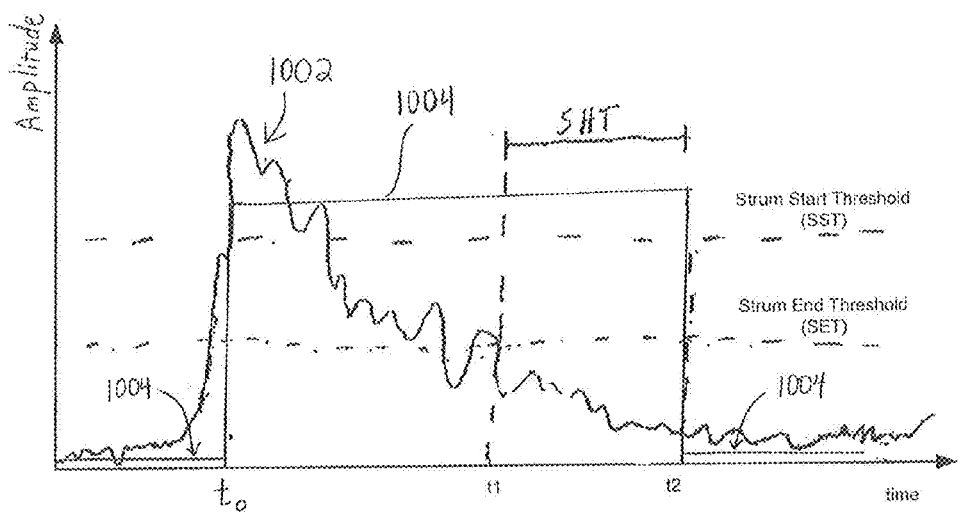
FIG. 10 shows an example of a filtered signal envelope estimate over time for use in a strum detector, according to some embodiments.

FIG. 10 shows an example of the application of the strum detector of FIG. 9 to a filtered signal envelope estimate 1002, for example as might be obtained by low pass filtering the output signal of the ADC module of controller output module 710. The output of the strum module is represented by logic output signal 1004. As shown, the strum module may begin in its no strum state, prior to time $t_o$. In this state, the logic output signal 1004 of the strum module is low, and the strum module may compare the value of the envelope estimate to the SST. The strum is first detected at time to when the envelope estimate 1002 first exceeds the SST, in response to which the strum module transitions to the strum high state, and its logic output signal 1004 goes high. In the strum high state, the strum module compares the value of the envelope estimate 1002 to the SET.

At time $t_1$, the envelope estimate 1002 is less than the SET, and the strum module transitions to its strum low state, during which the logic output signal 1004 remains high. The counter is begun, and the end of the strum is detected at time $t_2$ when the envelope estimate 1002 next remains below the SET for a duration longer than the SHT. Thus, at time $t_2$ the strum module transitions to its no strum state and its logic output signal 1004 goes low.

As mentioned above, it should be appreciated that various algorithms may be used to detect the beginning and end of a strum/strike, and that the examples of FIGS. 9-10 are not limiting. Other algorithms may be employed.

According to one embodiment, the strum detection module may determine the timing index component of the gaming input signal as described above independently of the operation of any sensors (e.g., finger position or fret sensors) that determine one or more other components (e.g., fret position components) of the gaming input signal. Alternatively, the determination of both components of the gaming input signals may be related. For example, a fret sensor circuit may be configured to only send an update of the fret sensor state to an external processing device or application when a strum event is detected by the strum detector. This provides output signals that more realistically reflect the way a corresponding instrument operates, but not all embodiments are limited in this respect. In another example, the strum detector may be configured to adjust the SST, SET, or SHT in response to a detected change in the fret sensor state.

According to some embodiments, software running on an external processing device (e.g., a gaming console, a computer, etc.) may generate visual and/or audio signals based at least in part upon the user's interaction with the stringed controller (e.g., based at least partially on the strikes of the strings and the fingering of the strings). This system may be used for any number of purposes including for entertainment such as for computer gaming, for education such as to facilitate training of the user in the use of the stringed instrument (e.g., in the use of a guitar in the example of FIG. 1) or in any other way, as aspects of the invention are not limited in any respect by the manner in which a software program (e.g., a game) responds to input from a stringed controller. Examples of software applications for use with a stringed controller are described below, but it should be appreciated that the various aspects described herein are not limited to use with any particular software applications.

Figure 22:
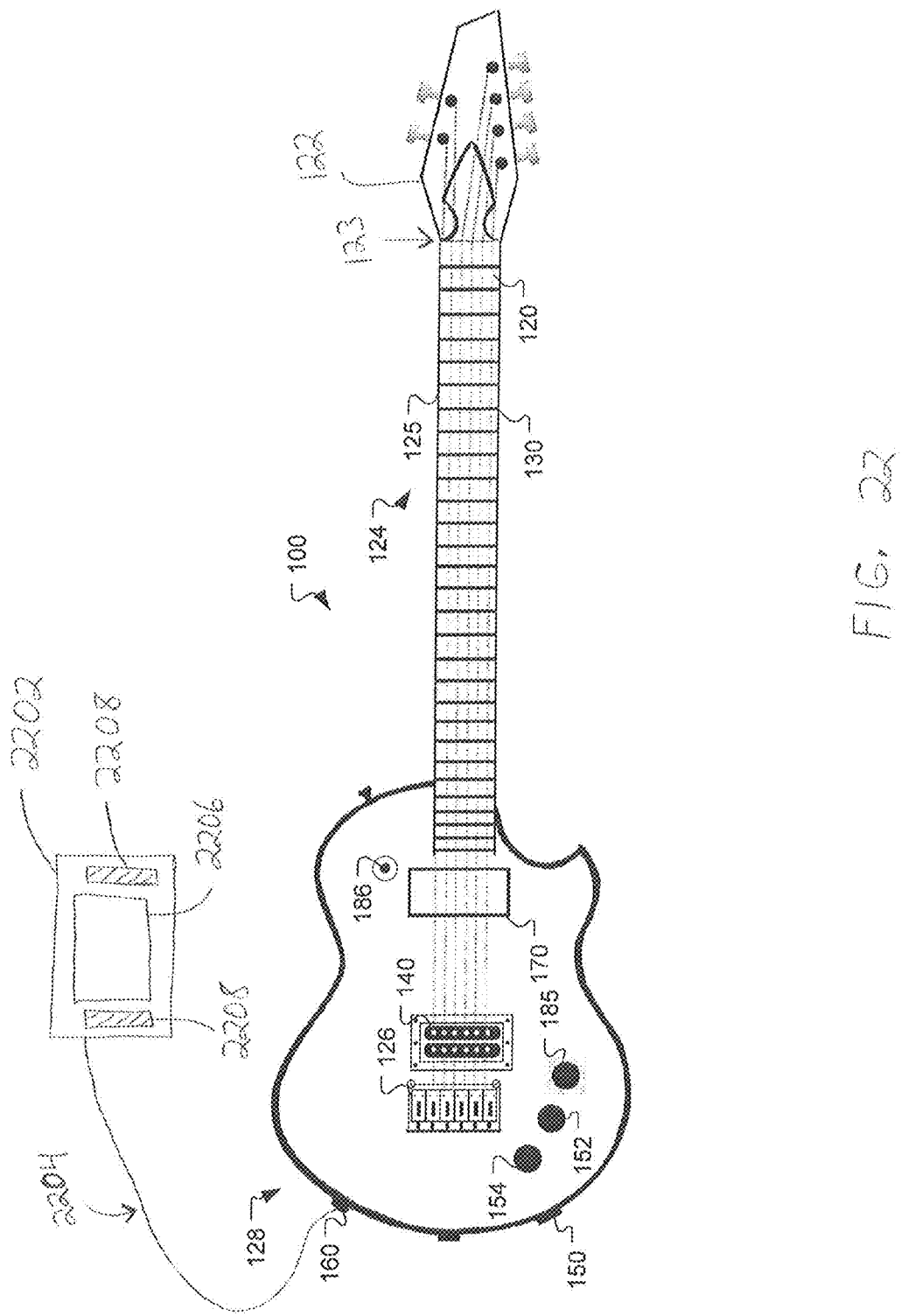
FIG. 22 illustrates a stringed game controller coupled to a processor for operating a gaming application, according to one embodiment.

As has been mentioned, one aspect of the technology described herein relates to the use of stringed game controllers, for example in the shape of a guitar, bass guitar, violin, or other stringed instrument. Such game controllers may be configured to be coupled to an external device including a processor (e.g., a personal computer, a gaming console, or any other device including a processor) operating a gaming application or other software application that responds to inputs from the stringed controller. For example, referring to the non-limiting embodiment of FIG. 22, an external device 2202, which may be a computer, a gaming console, or any other type of device including one or more processors, runs a computer gaming application or other software application that responds to the input signals generated by the stringed game controller (e.g., the apparatus 100 of FIG. 1) in response to user actions. The external device 2202 may be coupled to the apparatus 100 by a communication link 2204 that may include a wired connector through a communication port, such as USB port 160 in FIG. 1, a wireless link or in any other suitable manner. The computer gaming (or other software) application may interact with the user via a visual display (e.g., on a screen 2206) and/or audio output through, for example, gaming system or computer speakers 2208, a television, or in any other suitable manner.

According to some embodiments, the gaming application may be configured to produce Musical Instrument Digital Interface (MIDI) sounds (for example, via speakers 2208) corresponding to a plurality of instruments. In some embodiments, the user may be able to select the types of sounds produced from a MIDI instrument selector (e.g., guitar, tuba, trumpet, or any other instruments). Moreover, different MIDI instruments may be assigned (by a user or otherwise) to different frets of a fretted game controller, such that touching a string to a particular fret may result in the gaming application producing a sound corresponding to the instrument assigned to that fret. Similarly, sound effects may be assigned to frets (by user selection or otherwise) in some embodiments, such as reverb, delay, vibrato, pitch bending, or any other sound effect. Similarly, the gaming application may allow the user to assign particular chords to the frets, so that contacting a string to a particular fret may result in the gaming application sounding the chord assigned to that fret. It should thus be appreciated that according to various embodiments various effects (e.g., instrument type, note, sound effect, etc.) may be selected by a user (or otherwise assigned), and that the various aspects described herein are not limited in this respect.

Various examples of interfaces that a game or other software application may employ to interact with a user of a stringed controller will now be described. It should be appreciated that these examples are non-limiting, as the various aspects described herein relating to stringed game controllers are not limited to use with games or other software applications that use any particular type of user interfaces. For example, it should be appreciated that the stringed game controllers according to some aspects described herein may be compatible with any existing gaming applications, such as the Guitar Hero® games and others.

Figure 11:
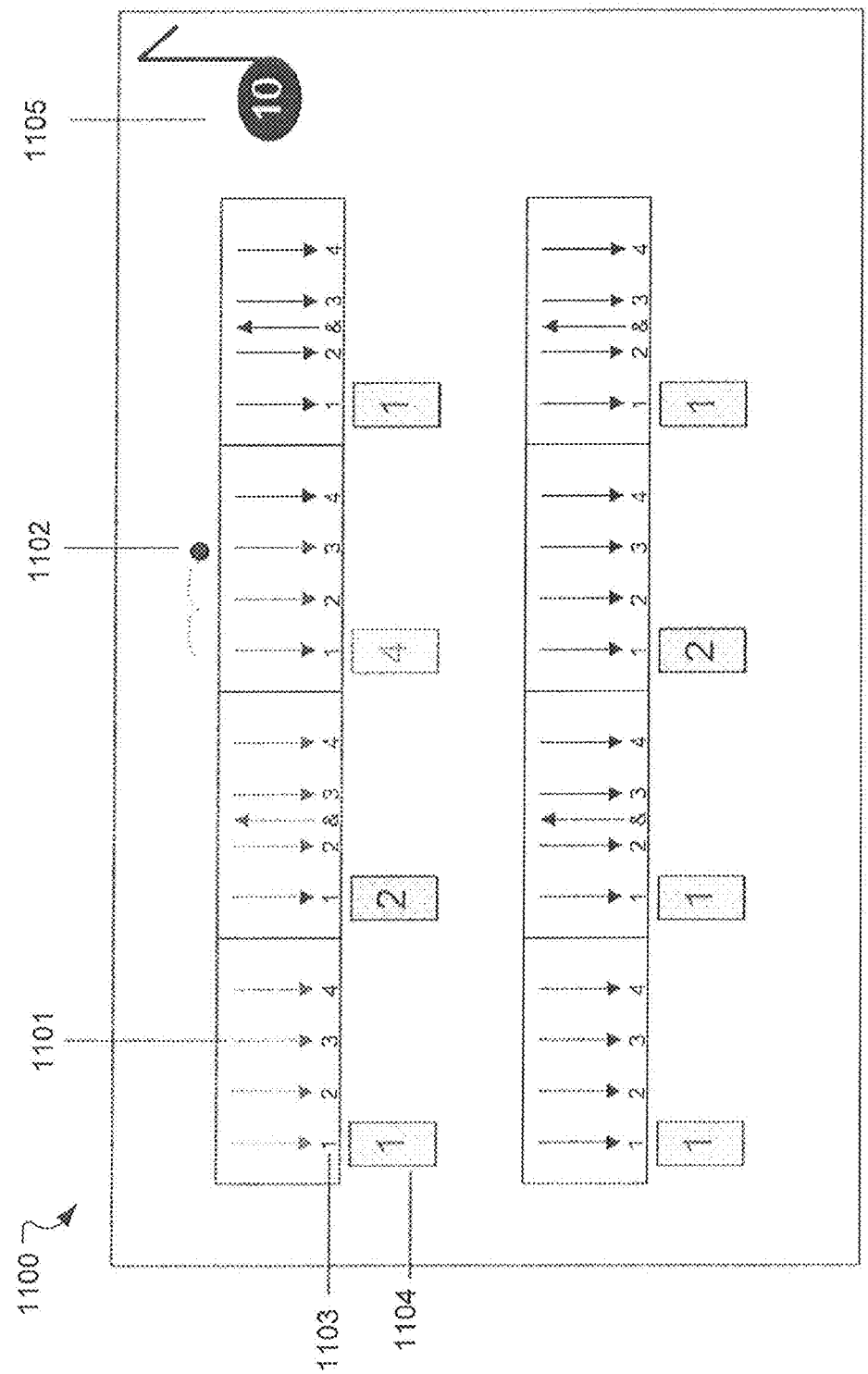
FIG. 11 shows an interactive visual display according to one embodiment of the present invention.

FIG. 11 shows an embodiment of an interactive visual display 1100 that provides user input directions to tell the user how and when to produce a gaming input signal. The interactive visual display 1100, which may be used in connection with a stringed game controller such as apparatus 100, communicates indications related to strum timing, fret fingering, and strum direction (e.g., up or down). A strum indicator 1101 (shown as an arrow in FIG. 11 but other visual cues can be used) indicates to the user when to strike the strings of the game controller with either an upward or downward stroke (e.g., by using a guitar pick or the user's fingers). When the user successfully strums at the correct time while pressing the correct fret (indicated by fret indicator 1104), a visual cue is provided to indicate this success to the user. This can be done in any suitable way. In one non-limiting example, the strum indicator 1101 changes to a "hit" color (e.g., changes from black to blue) to indicate correct performance. When the user strums at an incorrect time, strums while not pressing the correct fret, or fails to strum at all at the correct time, the strum indicator 1101 changes to a "miss" color (e.g., changes from black to red) to indicate a failed performance. When the strum indicator 1101 is black it indicates a strum that has not been played yet.

The interactive visual display 1100 also includes a tempo indicator 1102 which moves horizontally from left to right giving a visual indication of the tempo. The placement of the tempo indicator 1102 directly over a strum indicator 1101 indicates the user is to strum while depressing the correct fret. The tempo indicator 1102 may take any suitable form, such as a bouncing ball, a moving bar, or any other suitable form. Below the strum indicators 1101 is a rhythm count 1103 in the specific form of a number to help the user keep the proper rhythm count. It should be appreciated that the rhythm count 1103 may take any suitable form.

A fret indicator 1104 may be used to indicate the correct finger placement (e.g., the correct fret number to depress). For example a "1" may indicate to the user to press on the first fret of the game controller (e.g., a guitar-shaped game controller), a "2" the second fret, and so on. The fret indicator 1104 on the interactive visual display 1100 may be have a visual cue (e.g., color and/or number coded) that matches corresponding visual indicators 800 on the neck 124 of the apparatus 100, as shown for example in FIG. 8A, or may be coded in any suitable manner.

The interactive visual display 1100, which again is one non-limiting example of a suitable interactive display, also includes a score indicator 1105 that provides the user with feedback about how well the user did in correctly performing the visual cues illustrated on the display. Such feedback can be provided in any suitable way. For example, a user may get a point for each strum correctly executed, lose one or more points for incorrect or missed strums, receive bonus points for long, consecutive strings of successful strums without mistakes, etc. Other feedback mechanisms are also possible (e.g., separately noting correct and incorrect strums) and the aspects of the invention described herein are not limited in this respect.

It should be appreciated that interactive visual display 1100 is merely one non-limiting example of an interactive visual display, and that many variations and modifications of the interactive visual display 1100 are possible. For example, according to some specific embodiments, the game or software application may require (or have a selectable mode of operation that requires) only correctly timed strumming, regardless of whether a correct fret is depressed by the user. In such a case, the fret indicator 1104 may not appear on the interactive visual display 1100, and/or correct fingering may not be tracked and the user may only be required to strum the correct rhythm with open (non-fretted) or any fretted strings. In some such embodiments, a chord-progression may be pre-programmed to automatically change the chords at the correct time with no extra input needed by the user so a user can play along with a song simply by properly striking the strings. A similar approach may also be used for single-note melodies (solos, leads). Alternatively, some embodiments may require only proper fingering, without string striking. In such a case, the strum indicators 1101 might not appear, might appear as simple lines without a directional up or down arrowhead, or might optionally appear with a direction indicator. To produce sound, the user would only need to finger the frets or strings with the correct timing. It should be appreciated that other ways of interacting with the user are also possible.

Figure 12:
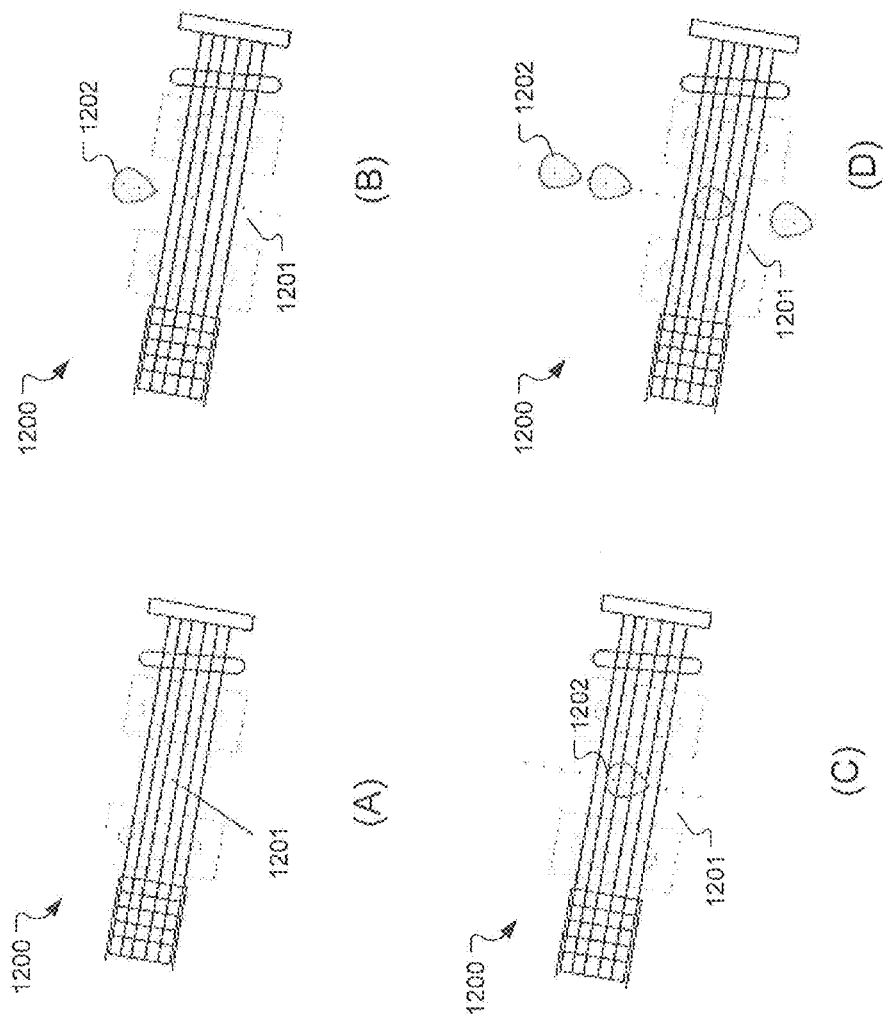
FIGS. 12 A-D show an interactive visual display according to another embodiment of the present invention.

FIGS. 12 A-D show an example of another interactive display interface 1200, which communicates strum timing. In this embodiment, a graphical representation of the strum area 1201 of the apparatus 100 is depicted. In the specific example shown, the strum area 1201 includes the bridge, pickups, bottom of the neck and guitar strings, however it should be appreciated that any suitable area may be displayed. Such an interactive display interface 1200 may be displayed all the time, or only when the concept of strumming is pertinent to game play. Therefore, fret fingering is not accounted for in this particular interactive display interface 1200. For example, such an interactive display interface 1200 may be used for unfretted open strumming of the strings. The interactive display interface 1200 may indicate that a user is supposed to strum when a falling pick icon 1202 passes over the strum area 1201. It should be appreciated that FIGS. 12A-D are merely examples, and that other ways of indicating strum timing are possible.

Figure 13:
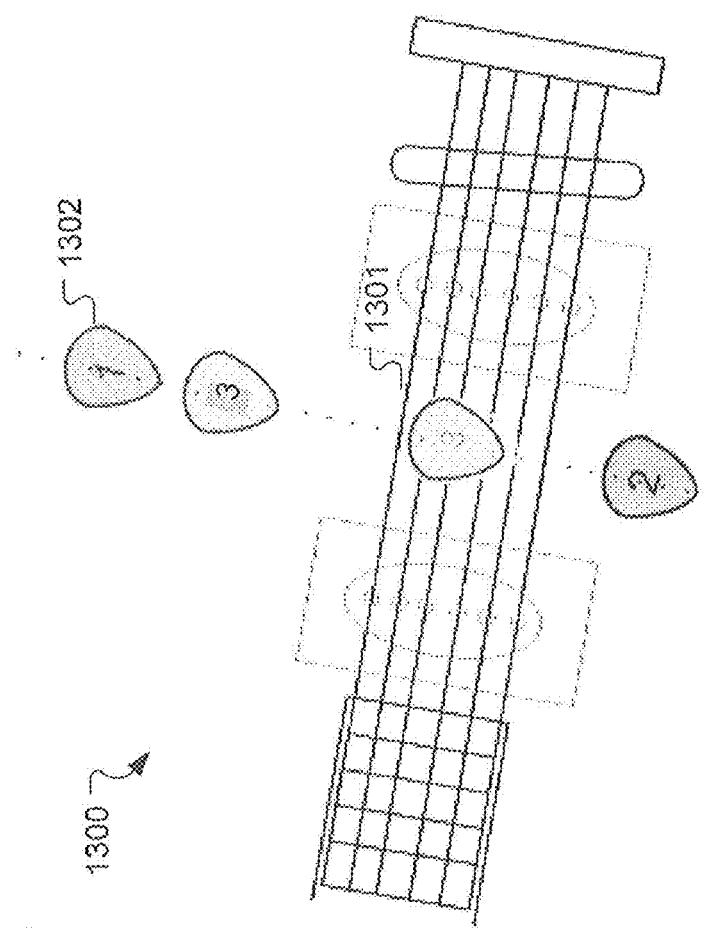
FIG. 13 shows an interactive visual display according to yet another embodiment of the present invention.

FIG. 13 shows another non-limiting example of an interactive display interface 1300 similar to the one shown in FIG. 12, but which communicates both strum timing and fret fingering information. In this non-limiting example, the pick icons 1302 may be coded to indicate fingering information, for example by adding color and/or number coding to the pick icons 1302, or by using any other suitable indicator of fingering information. A falling pick icon 1302 passing over the strum area 1301 may indicate that the user is to strum while simultaneously pressing the correct fret number.

Figure 14:
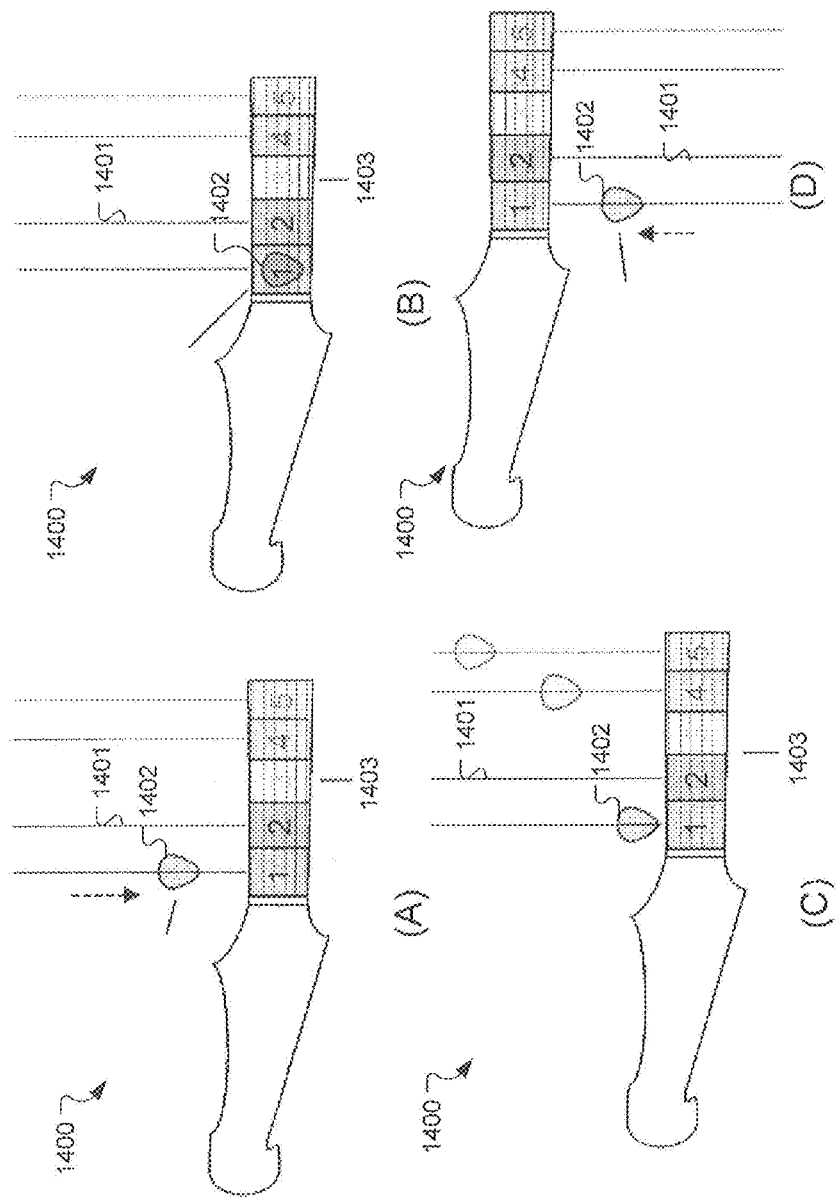
FIGS. 14 A-D show an interactive visual display according to a further embodiment of the present invention.

FIGS. 14 A-D show another embodiment of an interactive display interface 1400 that communicates strum timing and fingering information. In this embodiment, a representation of the headstock and first several frets on the neck of the apparatus 100 are depicted on the display interface 1400. There are five fret tracks 1401 that pick icons 1402 slide on, with each fret track 1401 corresponding to a target fret 1403. The fret tracks 1401 and/or the target frets 1403 may be coded using color and/or number coding, as shown, or using any other suitable type of coding (e.g., symbol coding, or any other suitable type of coding). The pick icons 1402 travel along the fret tracks 1401 towards the target frets 1403. When a pick icon 1402 intersects with a target fret 1403, the user is supposed to strum while simultaneously pressing the correct corresponding fret on the neck of the guitar-type controller 100.

Figure 15:
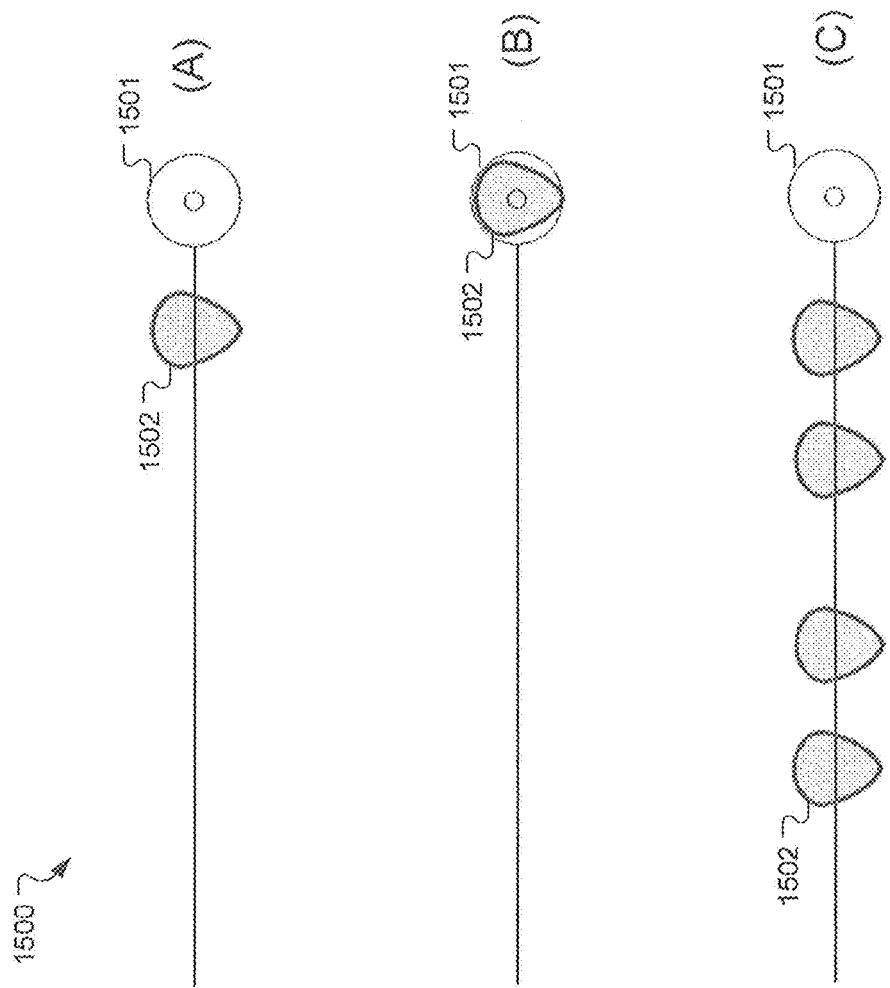
FIGS. 15 A-C show an interactive visual display according to another embodiment of the present invention.

FIGS. 15 A-C show another non-limiting example of an interactive display interface 1500, which includes a time target area 1501 and a pick icon 1502. The user is supposed to strum the strings of the game controller when a sliding pick icon 1502 passes over the time target area 1501. In this interactive display interface 1500, the direction of the sliding pick icons 1502 may be left to right, right to left, top to bottom, bottom to top, or any other suitable direction. Such an interactive display interface 1500 might be used all the time or only when the concept of strumming is pertinent to game play, and fingering is not accounted for in this particular interactive display interface 1500. For example, such an interactive display interface 1500 may be used for unfretted open strumming of the strings of the game controller.

Figure 16:
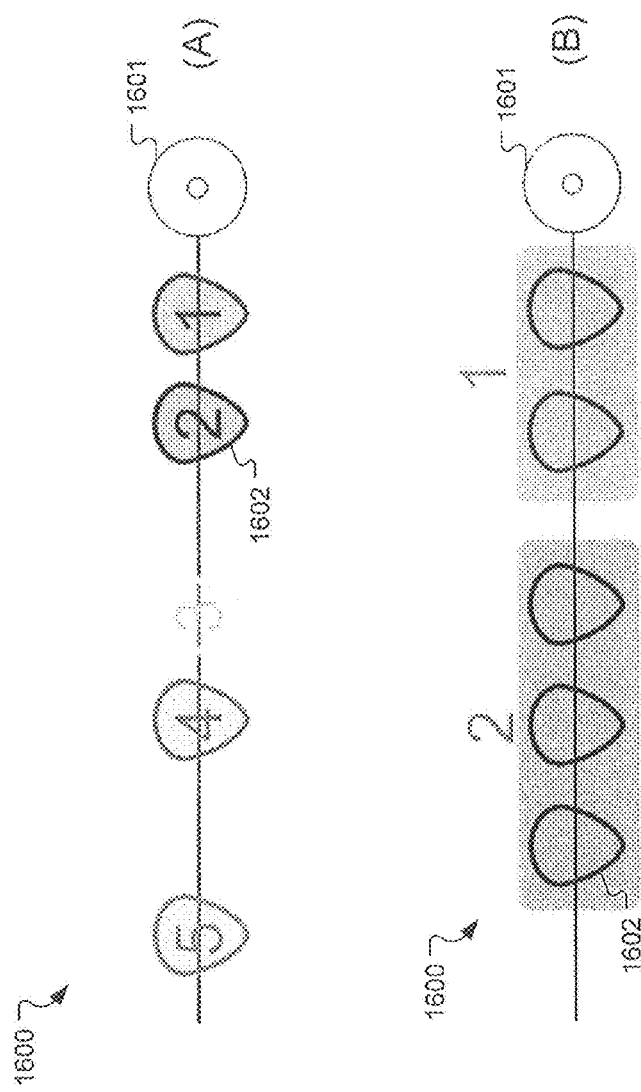
FIGS. 16 A-B show an interactive visual display according to a further embodiment of the present invention.

FIGS. 16 A-B show another non-limiting example of an interactive display interface 1600 similar to the one shown in FIG. 15, but which communicates both strum timing and fingering information by adding color and/or number coding to the pick icons 1602 to communicate fretting information. It should, however, be appreciated that any type of coding may be used to convey fingering information, as color and number coding are but two non-limiting examples. When a sliding pick icon 1602 passes over the time target area 1601, the user is to strum while simultaneously pressing the correct fret number. The embodiments in FIGS. 16A-B show two different methods for the coding of the pick icons to convey fret information. FIG. 16 A shows pick icons 1602 that are individually color and/or number coded. FIG. 16 B shows the use of groups of like pick icons 1602 that are color and/or number coded together. It should be appreciated that other manners of coding the pick icons are also possible, and that the display interfaces described herein are not limited to use with any particular type of coding.

Figure 17:
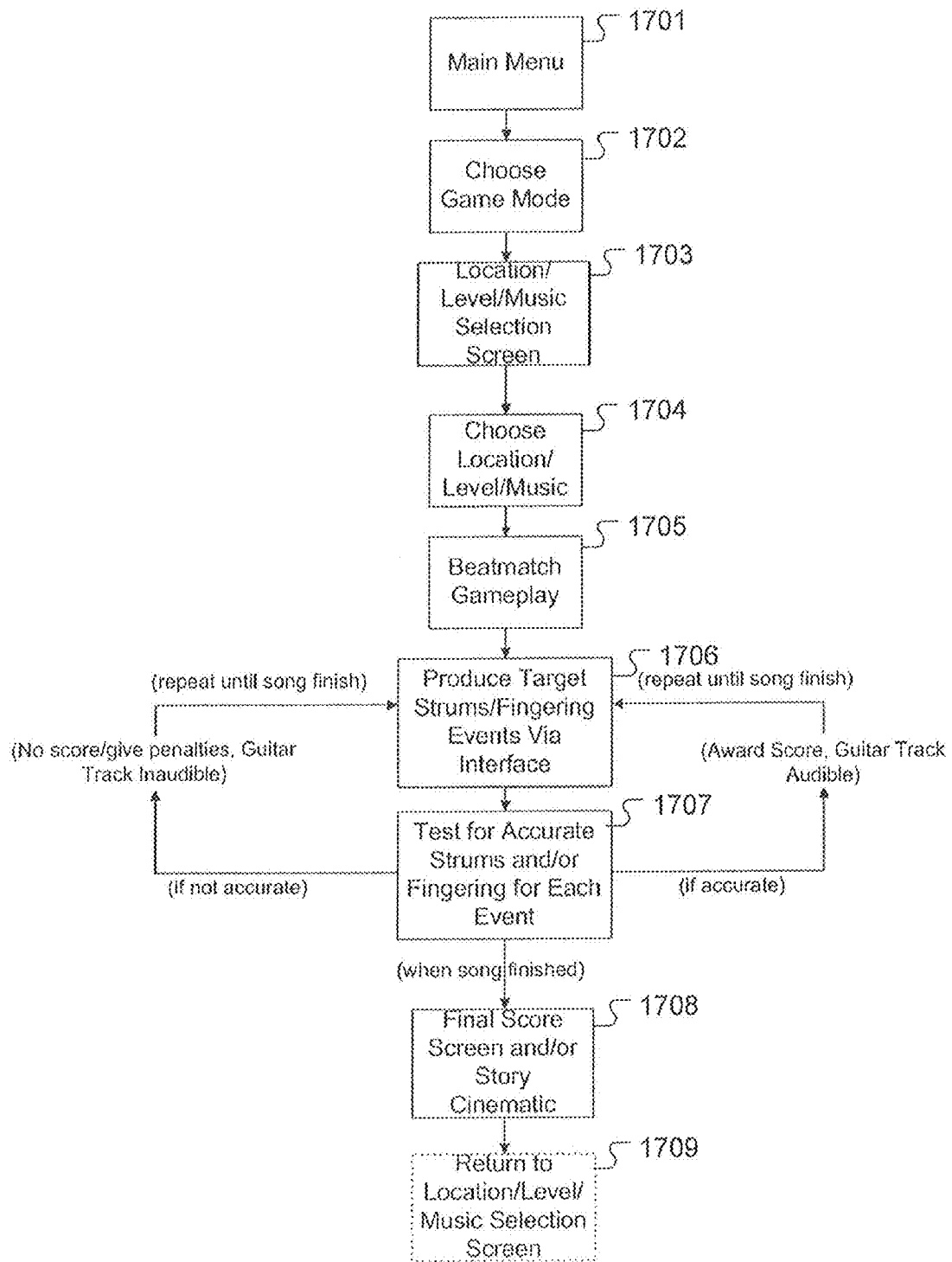
FIG. 17 shows various logical steps in a game flow according to one embodiment of the present invention.

FIG. 17 shows one non-limiting example of various logical steps in the flow of a game that can be controlled using a stringed controller according to any of the embodiments described herein. It should be appreciated that the steps may vary depending on the game, and that the various aspects described herein relating to playing of a game are not limited to any particular type(s) of steps, number, or order of steps.

As mentioned, FIG. 17 is a flowchart illustrating an example of the order of steps of game play flow of a game which may be played using a stringed controller according to any of the embodiments described herein. The game flow begins at the main menu, step 1701, which may allow a user, at 1702, to choose a mode of play or to alter game options. Upon choosing the game mode, the user is taken to a selection screen, step 1703, where he or she may choose, at 1704, a level (e.g., impacting degree of difficulty), location, music selection, or any other selection information. In this non-limiting example, once the chosen level/location/music is loaded a beat matching game play begins, step 1705.

The game interface produces a series of rhythm events, step 1706, such as the correct timing of a strum and/or fret press. Many of these events in a row constitute the beat matching play of an entire song. For each event, the game tests whether or not the user accurately strummed and/or fretted for that event, step 1707. If so, a score is awarded and the instrument audio track remains audible. If not, the user is awarded no score, or there may be a score penalty, and the guitar audio track may continue or become inaudible for the duration of that event. When all events are finished (i.e., when the song is over), the final score is displayed, step 1708, and a story scene, or cinematic, may occur, in the form of one or more transitional visual sequences which advances the game's story. The user is then returned to the location/level/music selection screen, step 1709, where they are prompted to choose another location, level and music selection for the next section of the game. Again, it should be appreciated that the types, number and order of steps illustrated in FIG. 17 are merely a non-limiting example, and that other possibilities for the flow of a game or program are also possible.

A stringed game controller, such as those discussed above, may be useful for other types of game play applications besides beat matching. For example, an application may employ specific defined melodic patterns (e.g., guitar licks) to control the game. For example, fretting and strumming fret "1" followed by fretting and strumming fret "2" is a melodic pattern that may be defined as "1, 2." A gaming application may require specific melodic patterns that have a specific utilization and application according to the rules of the game. For example, the user may be taught the melodic pattern "1, 2, 3," and then be informed that providing this melodic pattern in front of a closed door in the game will open that door. From that point forward, whenever the user encounters a closed door, he or she may, and in some embodiments must, perform the melodic pattern "1, 2, 3" to open the door. It should be appreciated that this is only one example, and that other melodic patterns may be used in other embodiments.

According to one embodiment, when a melodic pattern is performed, any sound, such as a specific musical note or a sound effect, may be played for each performed note of the pattern. The melodic pattern may or may not need to be played with a specific rhythm and timing depending on the game play context and application of this concept. Melodic patterns may contain two or more inputs, for example: "1, 2"; "3, 2, 3, 4, 1, 2, 5, 3, 2, 1, 2, 3", etc. According to one embodiment, melodic patterns (e.g., licks) may be given specific identifiers or names in the game play context to identify them and distinguish them to the user. For example, the door opener pattern described above may be named "Open Sesame" in the context of the game.

The user interactions that can control a gaming application (e.g., by opening a door, causing a character to run or take another action, etc.) are not limited to playing melodic patterns, and can include any desired manipulation of the strings on the controller. For example, some gaming applications may require specific manipulations of the stringed controller to cause specific actions in a game. A specific manipulation may be any specific input or series of inputs that can be performed on the stringed controller and be detected by the gaming application. That is, there may be specific inputs or series of inputs that have a specific utilization and application according to the rules of the game. For example, the user may be taught that pressing any two frets simultaneously in front of a closed door in the game will open that door. From that point forward, whenever the user encounters a closed door, he or she may press any two frets simultaneously to open the door. Examples of specific manipulations include, but are not limited to: pressing two or more specific frets simultaneously, pressing any two or more frets simultaneously, hammer-on either once or in rapid succession, pull-off either once or in rapid succession, strumming, strumming softly, strumming rigorously, strumming very slowly, strumming very quickly, playing any particular note or chord, any combination of the above, or any other suitable manipulations.

According to some embodiments, a gaming application may require fast, repeated strumming of the game controller's strings to fulfill a game objective. Thus the user may satisfy game play objectives by sustained, rapid strumming of the stringed controller. For example, the user's progress may be depicted by a bar or meter that fills as the user strums, until the goal is reached. The bar or meter may decay (deplete) at a specific rate, so that to fill the meter the user must consistently strum more quickly than the decay rate until the goal is achieved.

According to another embodiment, a gaming application may also, or alternatively, require open unfretted strumming to produce a defined chord progression, as shown in FIG. 18 A. Each time the user open strums, the predetermined chord progression progresses by one beat, during which a chord progression may be aurally produced via software, as shown. Similarly, some gaming applications may require open picking in response to a defined melody, as shown in FIG. 18 B. Each time the user open-picks a string, the predetermined melody progresses by one beat, during which the melody is produced aurally via software. These are two non-limiting examples, and it should be appreciated that other types of user interaction are also possible.

As should be appreciated from the foregoing, in some applications, the stringed controller may be used to control games that do not have a musical instrument play along theme. For example, a stringed controller can be used to control any type of game and be adapted to work with or replace controllers conventionally used to control such games. If the game requires the player to simulate proper musical instrument operation (e.g., play chords) to control game operation, the user experience in playing the game may simultaneously provide valuable practice time in the playing of the instrument.

In some specific gaming applications, the stringed controller may be used to simulate musical improvisation. For example, specific notes and/or chords may be related to each finger position or fret, so that when the strings are fingered and/or struck by the user, the specific note and/or chord is produced aurally by the software. The user can then be placed into a free mode of game play in which he or she is free to finger and strike/strum as desired with little or no game play rules or structure. The result is a simulation of musical improvisation, with or without background accompaniment music for the improvisation.

In some embodiments, a stringed game controller, such as apparatus 100 when used as a game controller, may be used to control a gaming avatar in two-dimensional or three-dimensional space. For example fingering the strings (e.g., pressing a specific fret) of the game controller in particular ways may cause the avatar to walk forward, walk backwards, left, or right. Other fingerings or strikes may cause the avatar to perform other actions, such as jumping, running, or any other action that makes sense in the context of the game play. Similarly, the controller also may be used to control a game camera view. For example, a specific fingering may cause the game camera to pan, zoom, rotate, pitch, yaw, swivel, or otherwise alter its state. Other functions within the gaming application may also, or alternatively, be controlled by the game controller, as those listed are merely non-limiting examples.

In some embodiments, the gaming or software application is configured to detect true chord fingerings (e.g., on the frets or otherwise) of the stringed controller. For example, a software application may ask the user to fret a D major chord and show the correct fingering. Then when frets number "2" and "3" are activated simultaneously, positive feedback may be given to the user in any suitable manner, e.g., audibly and/or visually, such as via the large check mark in FIG. 19. Thus, it should be appreciated that various aspects of the technology described herein may be used as an educational, or teaching aid.

As has been explained, various embodiments described herein may include producing timing and/or finger positioning signals using a stringed game controller. In some embodiments, information about the pitch of a string played is not produced, or is not sent to or detected by the gaming application. Alternatively, according to one embodiment, a real-time pitch detection algorithm may be included in the application software, and may be used to determine a pitch produced by the stringed controller. Any suitable pitch detection algorithm may be used, as the embodiments described herein that employ pitch detection are not limited in this respect. The pitch produced by the stringed controller may then be compared to a target pitch in the context of a game or other application. For example, pitch detection may be used in the context of beat matching game play or other type of game play, or in any other suitable application.

Embodiments of the present invention may also include a computer software application having an instrument (e.g., a guitar) training mode that trains the user to play a song or portion of a song on an instrument, using audio and visual feedback including an interactive display interface which may be similar to those discussed above. For example, in training mode, operation may optionally start by only requiring strumming without a "play-by-numbers fret indicator" appearing on the interactive display interface, and the player would only be required to strum the correct rhythm with open (non-fretted) strings. A chord progression may be pre-programmed into the computer software application so that the chord sounds would indeed be changing, but with no extra input needed by the user. The same method may also be used for single-note melodies such as solos and leads. Alternatively, a training mode of operation could start by only requiring fret fingering with the strum indicators appearing as lines with no directional up or down arrow.

Figure 23:
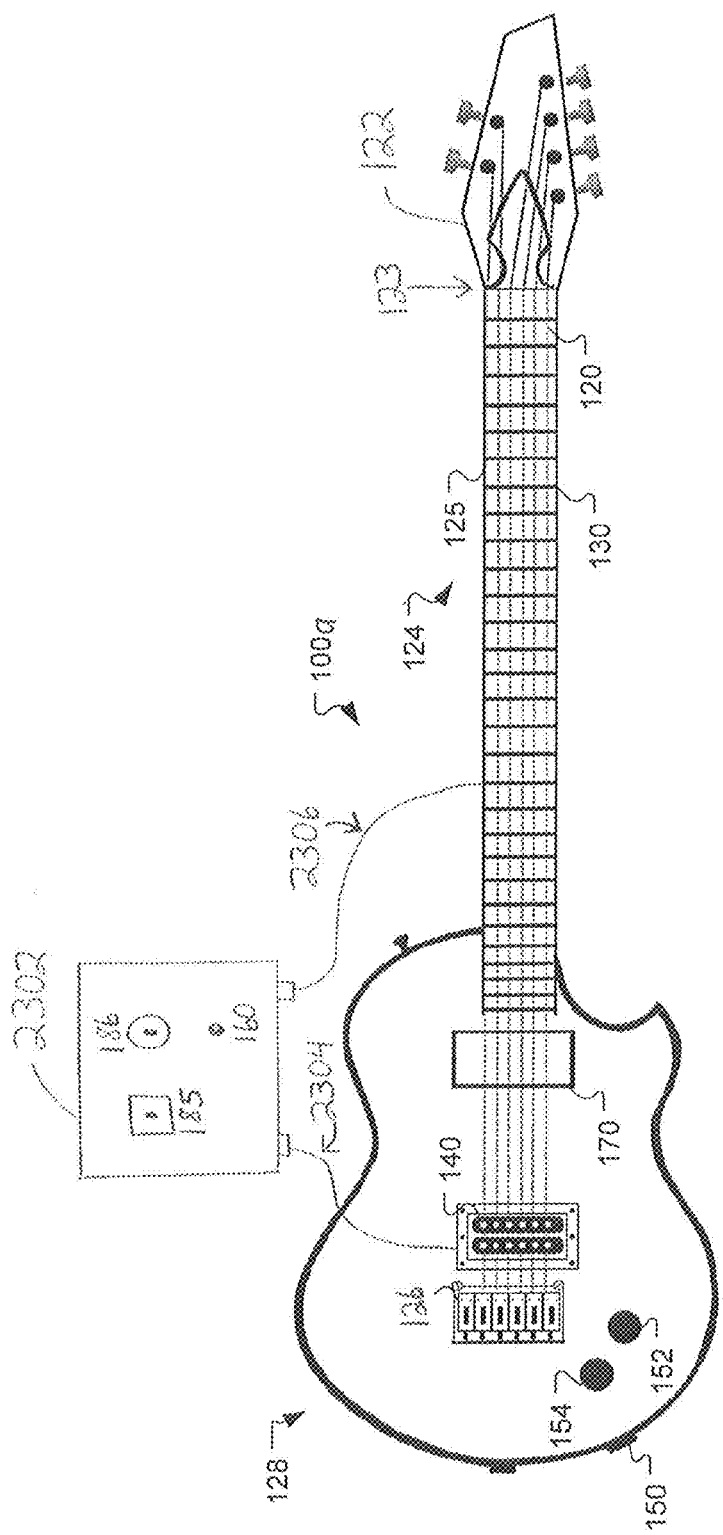
FIG. 23 illustrates an embodiment of the invention directed to an adapter that may be used to employ a stringed instrument as a stringed game controller.

As described above, some embodiments of the present invention are directed to a stringed game controller having a controller output module for detecting, processing, and outputting signals from the game controller either directly or indirectly (e.g., via any other suitable device) to a computer or gaming console executing a software application to be controlled by the controller. It should be appreciated that in some embodiments of the present invention, the controller output module need not be integrated into the same apparatus as the strings and supporting body of the stringed game controller. For example, as illustrated in FIG. 23, according to one embodiment a stringed game controller 100a may be provided that includes a controller output housed separately from the strings and their supporting body and coupled in any way (e.g., wired and/or wireless connection). For example, the controller output module may be housed in a box 2302 separate from the guitar body and strings, and may include any of the functionality discussed above in connection with the controller output module (e.g., as discussed in connection with the controller output module 710 in FIG. 7). For embodiments where additional controls are provided in addition to the strings (e.g., a joystick 185, sync button 186, etc.), they may be provided on the separate box 2302 as shown in FIG. 23. In some embodiments, the box 2302 may be detachably mounted to the guitar body 128, or may be a distinct box. Outputs from the strings 120 can be provided to the controller output module in the box 2302 in any suitable way, including using any of the techniques discussed above. For example, according to some embodiments output signals from pickup 140 may be provided to the box 2302 by a suitable connection 2304 (wired or wireless), such as an output cable, or any other suitable connection. According to some embodiments, one or more of the frets 130 may be electrically connected to the box 2302 by a suitable connection 2306, which may be configured to send a signal to the box 2302 when a string 120 contacts a fret 130. It should be appreciated that these are non-limiting examples of ways in which the box 2302 may be coupled to the guitar-shaped structure of FIG. 23 to receive output signals from which one or more gaming input signals may be derived, and that other coupling configurations and types are possible.

In addition, in accordance with one embodiment, the box 2302 can be formed as part of a kit or adapter that can adapt or retrofit any musical instrument (e.g., any guitar) into a stringed game controller so that the owner of an instrument may obtain an adapter and use his/her instrument as a game controller. For example, in some embodiments an acoustic-electric instrument (e.g., an acoustic-electric guitar) may be used as a game controller by employing an adapter kit including the box 2302. The pickup of the acoustic-electric instrument may be coupled to the box 2302 in the manner shown by connection 2304 of FIG. 23, and one or more of the frets of the instrument may be coupled to the box 2302 to detect when one or more of the strings 120 contact the fret(s), using a suitable connection (e.g., connection 2306, or any other suitable connection). For adapting a fretted instrument that does not have conductive strings, an alternate technique for detecting finger position may be employed (examples of which are discussed above).

Moreover, for instruments that do not have a pickup built in, such as some acoustic instruments (e.g., an acoustic guitar), a suitable pickup may be added to the instrument (e.g., an off-the-shelf pickup as part of a converter kit including the box 2302, or otherwise), and then the output of the pickup connected to box 2302, by a connection such as 2304. Other configurations are also possible. Thus, it should be appreciated that various features of the technology described are application to electric instruments, acoustic-electric instruments, acoustic instruments, and non-instruments (e.g., dedicated game controllers), and are not limited in this respect.

Similarly, while some detectors (e.g., conductive fret sensors for the frets 130 in FIG. 1) have been described as being integrated into the stringed controller, it should be appreciated that other configurations are possible. For example, according to some embodiments, fret sensors may be detachable from the frets 130, and may be connected to box 2302 as part of an adapter kit for adapting a stringed instrument to work as a game controller. Other configurations for fret sensors are also possible. In addition, as discussed above, other techniques can also be employed for detecting finger positions on the neck of a fretted or non-fretted instrument, and any of those techniques may be made removable to allow an instrument to be adapted to function as a game controller.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable storage medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for use with a stringed game controller that comprises a guitar body, a plurality of strings extending along at least a portion of the guitar body, and at least one sensor adapted to detect movement of the strings, the method comprising acts of:

(A) in response to a strike of at least one of the plurality of strings by a user of the game controller that causes vibration of the at least one of the plurality of strings, mechanically dampening the vibration through use of a retractable mechanical dampener by an amount sufficient to facilitate electronic detection of a subsequent strike of the at least one of the plurality of strings occurring within 0.5 seconds of the strike of the at least one of the plurality of strings, wherein the retractable mechanical dampener is partially recessed toward the guitar body when not engaging the at least one of the plurality of strings; and (B) producing at least one game control signal based on the strike of the at least one of the plurality of strings.

2. The method of claim 1, wherein mechanically dampening the vibration comprises reducing an initial amplitude of the vibration by at least 50% in less than 0.5 seconds.

3. The method of claim 2, wherein mechanically dampening the vibration comprises reducing the initial amplitude of the vibration by at least 80% in less than 0.5 seconds.

4. The method of claim 3, wherein mechanically dampening the vibration comprises reducing the initial amplitude of the vibration by at least 80% in less than 0.1 seconds.

5. The method of claim 1, wherein mechanically dampening the vibration comprises reducing an initial amplitude of the vibration by approximately 90% in less than approximately 25 milliseconds.

6. A stringed game controller comprising:
a guitar body;
a plurality of guitar strings extending along at least a portion of the guitar body;
at least one sensor coupled to the guitar body and adapted to detect movement of at least one guitar string of the plurality of guitar strings that results from a strike of the at least one guitar string by a user of the game controller that causes vibration of the at least one guitar string;

a retractable dampener coupled to the guitar body and having an engagement surface, wherein the retractable dampener is movable between a first position in which the engagement surface does not contact the at least one guitar string and a second position in which the engagement surface engages the at least one guitar string and dampens the vibration of the at least one guitar string; and at least one control module that is coupled to the at least one sensor and that provides at least one electrical signal indicating the striking of the at least one guitar string by the user wherein when the retractable dampener is in the first position it is at least partially recessed toward the guitar body.

7. The stringed game controller of claim 6, wherein the dampener dampens an amplitude of the vibration by at least 50% in less than one second.

8. The stringed game controller of claim 7, wherein the dampener dampens the amplitude of the vibration by at least 50% in less than 0.5 seconds.

9. The stringed game controller of claim 8, wherein the dampener dampens the amplitude of the vibration by at least 80% in less than 0.5 seconds.

10. The stringed game controller of claim 9, wherein the dampener dampens the amplitude of the vibration by at least 80% in less than 0.1 seconds.

11. The stringed game controller of claim 10, wherein the dampener dampens the amplitude of the vibration by approximately 90% in less than approximately 25 milliseconds.

12. The stringed game controller of claim 6, wherein the stringed game controller is configured to operate in a first mode as an electric guitar and in a second mode as a game controller suitable for controlling a video game, and wherein the at least one electrical signal indicating the striking of the at least one guitar string has a form suitable for controlling a video game when the game controller is operated in the second mode.

13. The stringed game controller of claim 6, wherein the engagement surface of the retractable dampener has a length parallel to a length of the plurality of strings sufficient to dampen an amplitude of the vibration by at least 50% in less than 0.5 seconds.

14. The stringed game controller of claim 6, wherein the engagement surface has a slot within which the at least one guitar string fits when the retractable dampener is in the second position.

15. The stringed game controller of claim 14, wherein the engagement surface has a plurality of slots and wherein each of the plurality of guitar strings fits within a respective one of the plurality of slots when the retractable dampener is in the second position.

16. The stringed game controller of claim 15, wherein the engagement surface comprises foam.

17. The stringed game controller of claim 6, wherein the engagement surface comprises foam.

18. The stringed game controller of claim 6, wherein when the retractable dampener is in the first position it is at least partially recessed within the guitar body.

19. The method of claim 1, further comprising engaging the retractable mechanical dampener with the at least one of the plurality of strings, wherein engaging the retractable mechanical dampener comprises at least partially elevating the retractable mechanical dampener from the body.

20. The method of claim 1, further comprising:
(C) disengaging the mechanical dampener from the at least one of the plurality of strings; and
(D) generating music by striking the plurality of strings.

21. The method of claim 1, wherein the stringed game controller comprises a guitar.

22. The method of claim 1, wherein the retractable mechanical dampener is partially recessed within the guitar body when not engaging the at least one of the plurality of strings.

* * * * *